US011037364B2

(12) United States Patent
Yushiya et al.

(10) Patent No.: US 11,037,364 B2
(45) Date of Patent: Jun. 15, 2021

(54) IMAGE PROCESSING SYSTEM FOR GENERATING A VIRTUAL VIEWPOINT IMAGE, METHOD OF CONTROLLING IMAGE PROCESSING SYSTEM, AND STORAGE MEDIUM

(71) Applicant: CANON KABUSHIKI KAISHA, Tokyo (JP)

(72) Inventors: Akihiko Yushiya, Tokyo (JP); Yuya Ota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 16/372,482

(22) Filed: Apr. 2, 2019

(65) Prior Publication Data

US 2019/0228565 A1 Jul. 25, 2019

Related U.S. Application Data

(63) Continuation of application No. PCT/JP2017/030697, filed on Aug. 28, 2017.

(30) Foreign Application Priority Data

Oct. 11, 2016 (JP) .............................. JP2016-200472

(51) Int. Cl.
*G06T 15/20* (2011.01)
*G06F 3/0481* (2013.01)
(Continued)

(52) U.S. Cl.
CPC ........ *G06T 15/205* (2013.01); *G06F 3/04815* (2013.01); *G06T 1/00* (2013.01);
(Continued)

(58) Field of Classification Search
CPC .. H04N 13/111; H04N 5/247; H04N 5/23229; H04N 5/232; H04N 5/225;
(Continued)

(56) References Cited

U.S. PATENT DOCUMENTS 5,583,796 A * 12/1996 Reese ..................... G06F 11/20
348/152
6,124,862 A * 9/2000 Boyken .............. H04N 5/44513
345/419

(Continued)

FOREIGN PATENT DOCUMENTS

EP 2389006 A2 * 11/2011 ........... G06T 15/205
JP H10105863 A 4/1998
(Continued)

OTHER PUBLICATIONS

Extended European Search Report issued in European Application No. 17859697.9 dated Apr. 1, 2020.
(Continued)

*Primary Examiner* — David E Harvey
(74) *Attorney, Agent, or Firm* — Rossi, Kimms & McDowell LLP

(57) ABSTRACT

An image processing system, which generates a virtual viewpoint image on the basis of captured images from a plurality of image capturing apparatuses for capturing an object from a plurality of directions, detects an error in at least one of the plurality of image capturing apparatuses, and generates the virtual viewpoint image using a captured image from an image capturing apparatus, among the plurality of image capturing apparatuses, in which an error has not been detected, as an image of a capturing field of the image capturing apparatus in which the error has been detected.

17 Claims, 21 Drawing Sheets

(51) Int. Cl.
H04N 5/247 (2006.01)
G06T 1/00 (2006.01)
H04N 5/232 (2006.01)
G06T 11/80 (2006.01)
G06T 19/00 (2011.01)
H04N 5/225 (2006.01)

(52) U.S. Cl.
CPC ............ G06T 1/0007 (2013.01); G06T 11/80 (2013.01); G06T 19/00 (2013.01); H04N 5/225 (2013.01); H04N 5/232 (2013.01); H04N 5/23229 (2013.01); H04N 5/247 (2013.01)

(58) Field of Classification Search
CPC ... G06F 3/04815; G06T 15/205; G06T 11/80; G06T 1/00; G06T 19/00; G06T 1/0007
See application file for complete search history.

(56) References Cited

U.S. PATENT DOCUMENTS

| | | | | |
|---|---|---|---|---|
| 6,741,250 B1* | 5/2004 | Furlan | ............... | G06T 19/003 345/427 |
| 8,560,951 B1* | 10/2013 | Snyder | ............... | H04N 5/268 715/723 |
| 9,172,918 B2* | 10/2015 | Palmer | ............... | H04N 7/181 |
| 9,873,379 B2* | 1/2018 | Takaki | ............... | G06T 3/4038 |
| 2001/0028399 A1* | 10/2001 | Conley | ............... | H04N 5/262 348/239 |
| 2002/0196327 A1* | 12/2002 | Rui | ............... | H04N 7/181 348/14.11 |
| 2004/0190056 A1* | 9/2004 | Hata | ............... | H04N 5/265 358/1.15 |
| 2005/0018045 A1* | 1/2005 | Thomas | ............... | G06K 9/209 348/157 |
| 2005/0088505 A1* | 4/2005 | Shinohara | ............... | G03G 15/5008 347/116 |
| 2006/0029134 A1* | 2/2006 | Winder | ............... | H04N 19/46 375/240.12 |
| 2008/0048848 A1* | 2/2008 | Kawakami | ............... | G06T 1/60 340/435 |
| 2009/0290848 A1* | 11/2009 | Brown | ............... | H04N 5/262 386/223 |
| 2010/0013930 A1* | 1/2010 | Matsuo | ............... | B60R 1/00 348/148 |
| 2010/0026809 A1* | 2/2010 | Curry | ............... | G06K 9/209 348/157 |
| 2010/0182508 A1* | 7/2010 | Casper | ............... | H04N 5/265 348/578 |
| 2010/0238264 A1* | 9/2010 | Liu | ............... | G06T 7/55 348/14.13 |
| 2010/0329358 A1* | 12/2010 | Zhang | ............... | H04N 19/187 375/240.26 |
| 2011/0254927 A1* | 10/2011 | Yahata | ............... | G06T 15/20 348/46 |
| 2011/0254958 A1* | 10/2011 | Kotani | ............... | G06T 15/205 348/159 |
| 2011/0317033 A1* | 12/2011 | King | ............... | H04N 5/367 348/231.99 |
| 2012/0188452 A1* | 7/2012 | Keiser | ............... | G06T 13/00 348/559 |
| 2013/0050581 A1* | 2/2013 | Deshpande | ............... | H04N 5/262 348/705 |
| 2013/0051763 A1* | 2/2013 | Gong | ............... | H04N 5/91 386/242 |
| 2013/0129192 A1* | 5/2013 | Wang | ............... | G06T 7/55 382/154 |
| 2014/0150752 A1* | 6/2014 | Woods | ............... | F02M 33/02 123/520 |
| 2014/0340404 A1* | 11/2014 | Wang | ............... | G06T 19/006 345/427 |
| 2015/0215600 A1* | 7/2015 | Norkin | ............... | H04N 13/111 348/43 |
| 2015/0244989 A1* | 8/2015 | Liao | ............... | H04N 5/247 348/159 |
| 2015/0326902 A1* | 11/2015 | Levakov | ............... | H04N 21/8352 725/59 |
| 2016/0165148 A1* | 6/2016 | Itoh | ............... | H04N 5/247 348/148 |
| 2016/0165215 A1* | 6/2016 | Gu | ............... | G06T 17/00 348/43 |
| 2017/0013283 A1* | 1/2017 | Zhang | ............... | H04N 21/23109 |
| 2017/0124712 A1* | 5/2017 | Liu | ............... | G06K 9/209 |
| 2017/0127035 A1* | 5/2017 | Kon | ............... | H04S 5/02 |
| 2017/0134712 A1* | 5/2017 | Remer | ............... | H04N 13/156 |
| 2018/0225840 A1* | 8/2018 | Ikeda | ............... | H04N 5/247 |
| 2018/0244199 A1* | 8/2018 | Gyori | ............... | G06T 11/60 |
| 2019/0174109 A1* | 6/2019 | Yoshikawa | ............... | G06T 15/20 |
| 2019/0191146 A1* | 6/2019 | Koyama | ............... | G06T 7/80 |
| 2019/0394375 A1* | 12/2019 | Barnich | ............... | H04N 5/23238 |

FOREIGN PATENT DOCUMENTS

| | | | |
|---|---|---|---|
| JP | H11098342 A | | 4/1999 |
| JP | 2001346193 A | * | 12/2001 |
| JP | 2003244728 A | | 8/2003 |
| JP | 2005354289 A | * | 12/2005 |
| JP | 2008217243 A | * | 9/2008 |
| JP | 2014215828 A | | 11/2014 |
| JP | 2016001833 A | | 1/2016 |
| WO | WO-2011121117 A1 | * | 10/2011 ............ G06T 15/205 |

OTHER PUBLICATIONS

Furihata. "Novel View Synthesis with Residual Error Feedback for FTV", SPIE, Jan. 1, 2010, vol. 7524, pp. 1-12.

Li, "Virtual View Specification and Synthesis for Free Viewpoint Television", IEEE Transactions on Circuits and Systems for Video Technology, Apr. 2009, pp. 533-546, vol. 19, No. 4.

International Search Report issued in Intl. Appln. No. PCT/JP2017/030697 dated Oct. 3, 2017. English translation provided.

Written Opinion issued in Intl. Appln. No. PCT/JP2017/030697 dated Oct. 3, 2017.

* cited by examiner

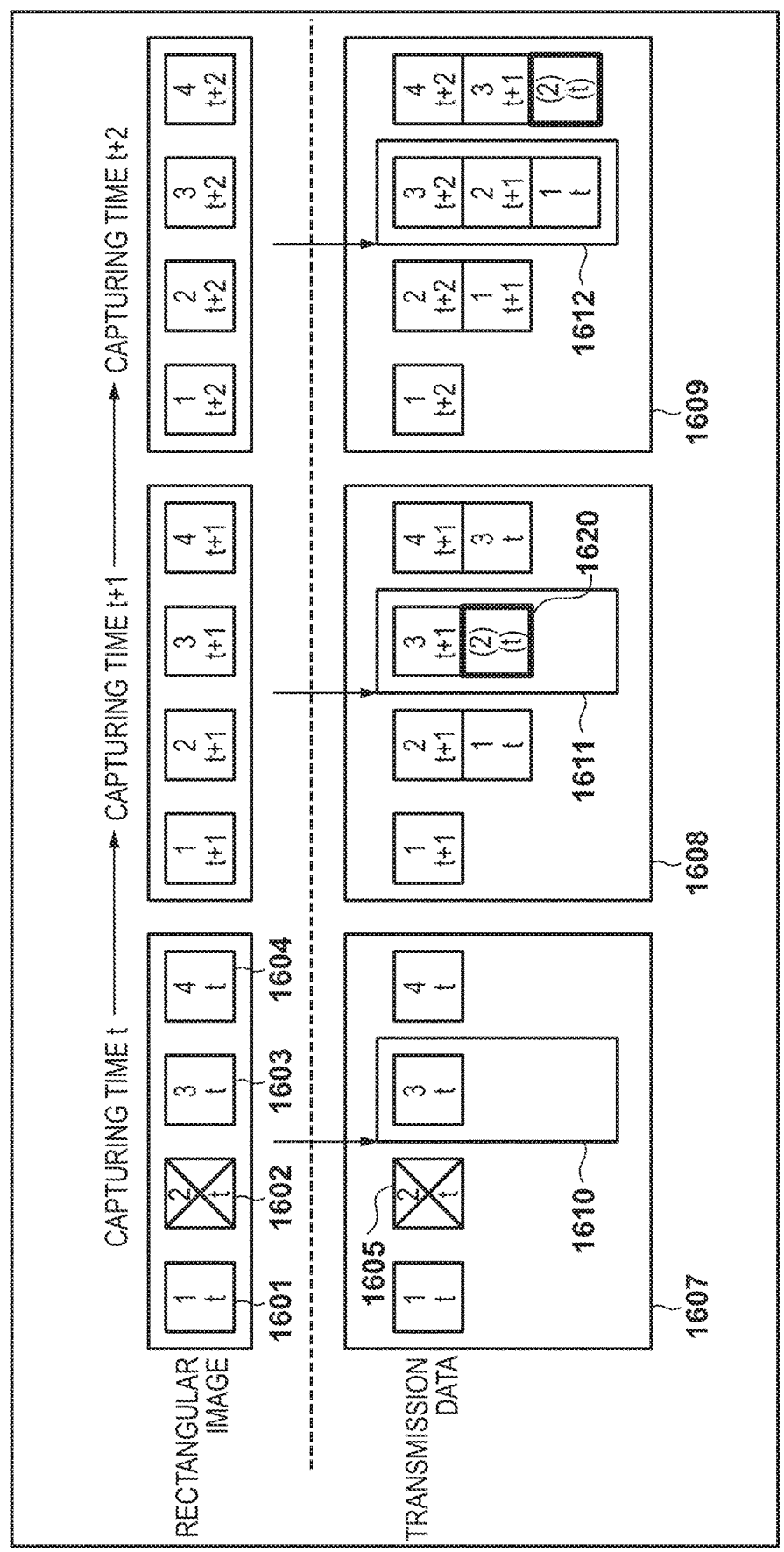

IMAGE PROCESSING SYSTEM FOR GENERATING A VIRTUAL VIEWPOINT IMAGE, METHOD OF CONTROLLING IMAGE PROCESSING SYSTEM, AND STORAGE MEDIUM

CROSS-REFERENCE TO RELATED APPLICATIONS

This application is a Continuation of International Patent Application No. PCT/JP2017/030697, filed Aug. 28, 2017, which claims the benefit of Japanese Patent Application No. 2016-200472, filed Oct. 11, 2016, both of which are hereby incorporated by reference herein in their entirety.

BACKGROUND OF THE INVENTION

Field of the Invention

The present invention relates to an image processing system including a plurality of cameras for capturing an object from a plurality of directions.

Background Art

Techniques for generating virtual viewpoint content by placing a plurality of cameras at different locations, synchronously capturing from a plurality of viewpoints, and using images from the plurality of viewpoints obtained from the capturing, have recently been garnering attention. With a technique that generates virtual viewpoint content from images from a plurality of viewpoints, soccer or basketball highlight scenes, for example, can be viewed from a variety of angles, which can provide users with a greater sense of presence than with normal images.

Virtual viewpoint content based on images from a plurality of viewpoints is generated by an image processing unit such as a server collecting images captured by a plurality of cameras, generating a three-dimensional model, and executing processing such as rendering, and then transmitting the result to a user terminal for viewing.

Patent Document 1 discloses a technique in which a plurality of cameras are arranged so as to surround the same range, and a desired virtual viewpoint image is generated and displayed using images of the same range captured by the plurality of cameras.

CITATION LIST

Patent Literature

Patent Document 1: Japanese Patent Laid-Open No. 2014-215828

However, there has been a risk that, depending on the state of one or more of the plurality of cameras, an appropriate virtual viewpoint image will not be generated. For example, when generating a virtual viewpoint image in an image system that reduces network transmission loads by, for example, daisy-chaining the plurality of cameras, situations may arise where some of the plurality of cameras malfunction or lose power, an object is placed in front of a camera, and so on. In such a situation, it is possible that images captured by cameras ahead of the malfunctioning camera in the daisy chain, for example, cannot be used to generate the virtual viewpoint image. When this happens, there is a risk of missing parts in the virtual viewpoint image, a drop in the quality of the image, and so on. This problem also arises in systems where the cameras and server are arranged in a star connection, for example, rather than being daisy-chained. This problem is not limited to the generation of virtual viewpoint images, and arises in a similar manner when generating an image using images captured by a plurality of cameras, such as a panoramic image.

An embodiment of the present invention has been achieved in light of the above-described problems, and discloses an image processing system that reduces the likelihood that an appropriate image will not be generated from images captured by a plurality of cameras.

SUMMARY OF THE INVENTION

According to one aspect of the present invention, there is provided an image processing system for generating a virtual viewpoint image on the basis of captured images from a plurality of image capturing apparatuses for capturing an object from a plurality of directions, the system comprising: a detection unit configured to detect an error in at least one of the plurality of image capturing apparatuses; and a generation unit configured to generate the virtual viewpoint image using a captured image from an image capturing apparatus, among the plurality of image capturing apparatuses, in which an error has not been detected by the detection unit, as an image of a capturing field of the image capturing apparatus in which the error has been detected by the detection unit.

Further features of the present invention will become apparent from the following description of exemplary embodiments with reference to the attached drawings.

BRIEF DESCRIPTION OF DRAWINGS

FIG. 16B is a diagram illustrating an overview of a transmission process according to an embodiment.

DESCRIPTION OF EMBODIMENTS

Figure 1:
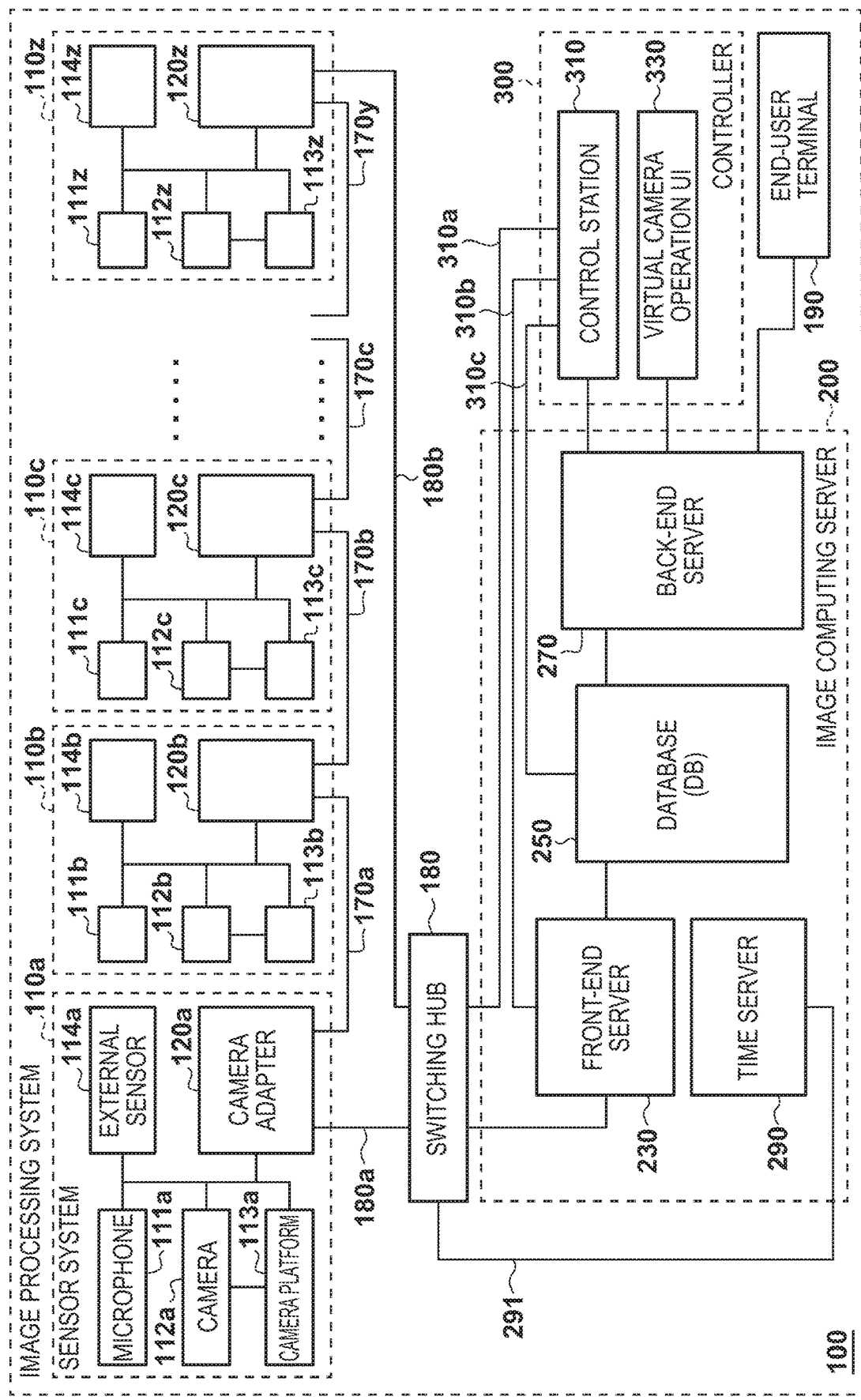
FIG. 1 is a block diagram illustrating an example of the configuration of an image processing system 100 according to a first embodiment.

Hereinafter, examples of embodiments of the present invention will be described with reference to the appended drawings.

First Embodiment

A system that captures images and records sound by installing a plurality of cameras and microphones at a facility such as a sports field (stadium) or a concert hall will be described using the system configuration diagram in FIG. 1. An image processing system 100 includes sensor systems 110a to 110z, an image computing server 200, a controller 300, a switching hub 180, and an end-user terminal 190. The first embodiment describes a configuration in which a virtual viewpoint image is generated on the basis of a plurality of captured images obtained by a plurality of cameras.

The controller 300 includes a control station 310 and a virtual camera operation UI 330. The control station 310 manages operation states, controls parameter settings, and so on for the block constituting the image processing system 100, through networks (310a to 310c, 180a, and 180b) and daisy chains (170a to 170y). Here, the networks may be GbE (Gigabit Ethernet) or 10 GbE, based on the Ethernet (registered trademark) IEEE standard, or may be constituted by a combination of interconnect Infiniband and industrial Ethernet or the like. The networks are not limited thereto, however, and may be another type of network such as a wireless network.

First, operations through which the sensor system 110z transmits 26 sets of images and audio from the sensor systems 110a to 110z to the image computing server 200 will be described. With the image processing system 100 according to the present embodiment, the sensor systems 110a to 110z are daisy-chained (170a to 170y).

Note that in the embodiment described below, the term "sensor systems 110" will be used when there is no need to distinguish among the 26 sets of the sensor systems 110a to 110z. Likewise, the devices in each of the sensor systems 110 will be referred to as a microphone 111, a camera 112, a camera platform 113, an external sensor 114, and a camera adapter 120 when there is no need to distinguish among the respective sets thereof. Although FIG. 1 illustrates a case where there are 26 sets of sensor systems, this is merely an example, and the number of systems is not limited thereto. Furthermore, in the present embodiment, the term "image" includes the concepts of both moving images and still images unless otherwise specified. In other words, the image processing system 100 according to the present embodiment can process both still images and moving images. Additionally, although the present embodiment describes an example in which virtual viewpoint content provided by the image processing system 100 includes both virtual viewpoint images and virtual viewpoint audio, the configuration is not limited thereto. For example, the virtual viewpoint content need not include audio. Also, for example, the audio included in the virtual viewpoint content may be audio recorded by the microphone closest to a virtual viewpoint. Furthermore, to simplify the descriptions, the present embodiment sometimes omits descriptions of audio, but it is basically assumed that images and audio are processed together.

The sensor systems 110a to 110z include cameras 112a to 112z, respectively. In other words, the image processing system 100 includes a plurality of cameras for capturing an object from a plurality of directions. The plurality of sensor systems 110 are daisy-chained (170a to 170y). This connection format makes it possible to reduce the number of connection cables, reduce the work required for wiring, and so on, as resolutions and framerates of captured images increase (e.g., 4K or 8K) and the amounts of image data increase as a result. Note that the connection format among the plurality of sensor systems 110 is not limited to this format. For example, a star type network configuration may be used, in which each of the sensor systems 110a to 110z is connected to the switching hub 180 and the sensor systems 110 transmit and receive data with each other via the switching hub 180.

Furthermore, although FIG. 1 illustrates a configuration in which all of the sensor systems 110a to 110z are cascade-connected to form a daisy chain, the configuration is not limited thereto. For example, a connection format may be used in which the plurality of sensor systems 110 are divided into several groups, and the sensor systems 110 are daisy-chained in units of those groups. In this case, the camera adapter 120 at the end of each group may be connected to the switching hub, and may input images to the image computing server 200. Such a configuration is particularly useful in stadiums. For example, consider a case where a stadium is made up of multiple floors and the sensor systems 110 are arranged on a floor-by-floor basis. In this case, images can be input to the image computing server 200 on a floor-by-floor basis, or for each half of the perimeter of the stadium, which simplifies the installation and makes the system more flexible for locations where wiring all of the sensor systems 110 into a single daisy chain is difficult.

Control of the image processing by the image computing server 200 is switched depending on whether only one, or two or more, of the camera adapters 120 are daisy-chained and input images into the image computing server 200. In other words, control is switched in the image computing server 200 depending on whether or not the sensor systems 110 are divided into multiple groups. If only one camera adapter 120 inputs images, the image data from all of the cameras is consolidated by transmitting the images over the daisy chain, and thus the timings at which all of the image data is consolidated in the image computing server 200 are synchronized. In other words, synchronization is possible when the sensor systems 110 are not divided into groups.

On the other hand, if a plurality of the camera adapters 120 input images to the image computing server 200 (when the sensor systems 110 are divided into groups), it is conceivable that the latency will differ depending on the daisy chain lane (path). Accordingly, it is necessary for the image computing server 200 to carry out synchronization control that achieves synchronization by waiting until the image data from all of the cameras has been consolidated, and then carry out the later-stage image processing while checking the assembly of the image data.

In the present embodiment, each sensor system 110 includes the microphone 111, the camera 112, the camera platform 113, the external sensor 114, and the camera adapter 120. However, the configuration is not limited thereto, and it is sufficient for the sensor system 110 to include at least one camera adapter 120 and one camera 112. Also, for example, the sensor system 110 may be constituted by a single camera adapter 120 and a plurality of cameras 112, or may be constituted by a single camera 112 and a plurality of camera adapters 120. In other words, the plurality of cameras 112 and the plurality of camera adapters 120 in the image processing system 100 correspond at a ratio of N-to-M (where N and M are both integers of 1 or more). The sensor system 110 may also include devices aside from the microphone 111, the camera 112, the camera platform 113, and the camera adapter 120. Furthermore, a front-end server 230 may provide at least part of the functionality of the camera adapters 120. Although the present embodiment assumes that the sensor systems 110a to 110z have the same configuration, as illustrated in FIG. 1, it is not necessary for all of the sensor systems 110a to 110z to have the same configuration.

Audio recorded by the microphone 111a of the sensor system 110a, and an image captured by the camera 112a and subjected to image processing (described later), are transmitted over the daisy chain 170a, from the camera adapter 120a to the camera adapter 120b of the sensor system 110b. The sensor system 110b transmits its own recorded audio and captured image to the sensor system 110c along with the image and audio transmitted from the sensor system 110a. By continuing this processing, the images and audio obtained by the sensor systems 110a to 110z are transmitted to the switching hub 180 from the sensor system 110z, using the network 180b. The images and audio transmitted to the switching hub 180 are then transmitted from the switching hub 180 to the image computing server 200.

Although the first embodiment describes a configuration in which the cameras 112a to 112z and the camera adapters 120a to 120z are separate, these elements may be integrated within a single housing. In this case, the microphones 111a to 111z may be built into the integrated cameras 112, or may be connected to the cameras 112 externally.

The configuration and operations of the image computing server 200 will be described next. The image computing server 200 according to the present embodiment processes the data obtained from the sensor system 110z. As a result of the above-described daisy-chaining, the data obtained from the sensor system 110z includes the image data obtained by the sensor systems 110a to 110z. The image computing server 200 includes the front-end server 230, a database 250, a back-end server 270, and a time server 290.

The time server 290 has a function for distributing time and synchronization signals, and distributes the time and synchronization signals to the sensor systems 110a to 110z via a network 291 and the switching hub 180. Having received the time and synchronization signals, the camera adapters 120a to 120z genlock the cameras 112a to 112z on the basis of the time and synchronization signals to achieve image frame synchronization. In other words, the time server 290 synchronizes the capturing timings of the plurality of cameras 112. As a result, the image processing system 100 can generate a virtual viewpoint image on the basis of a plurality of captured images captured at the same timing, which makes it possible to suppress a drop in image quality in the virtual viewpoint image caused by skew between the capturing timings. Although the present embodiment assumes that the time server 290 manages the time synchronization among the plurality of cameras 112, the configuration is not limited thereto. For example, the processing for synchronizing the times may be carried out independently by the cameras 112 or the camera adapters 120.

The front-end server 230 reconstructs segmented transmission packets from the images and audio obtained from the sensor system 110z and converts the data format thereof, and then writes the data into the database 250 in accordance with a camera identifier, data type, frame number, and the like. As a result, a frame number and image and audio data are stored in the database 250 in association with each other, for each of the cameras. The back-end server 270 receives a designation of a viewpoint from the virtual camera operation UI 330, and on the basis of the received viewpoint, reads out the corresponding image and audio data from the database 250 and carries out a rendering process to generate a virtual viewpoint image and virtual viewpoint audio.

Note that the configuration of the image computing server 200 is not limited to this configuration. For example, at least two of the front-end server 230, the database 250, and the back-end server 270 may be configured as an integrated entity. A plurality of at least one of the front-end server 230, the database 250, and the back-end server 270 may be included as well. Additionally, apparatuses aside from the stated apparatuses may be included in any desired apparatus within the image computing server 200. Furthermore, the end-user terminal 190, the virtual camera operation UI 330, or the like may provide at least some of the functionality of the image computing server 200.

The image obtained from the rendering process (the virtual viewpoint image) is transmitted to the end-user terminal 190 from the back-end server 270. A user operating the end-user terminal 190 can view the image and audio from the designated viewpoint. In other words, the back-end server 270 generates virtual viewpoint content based on captured images captured by the plurality of cameras 112 (images from a plurality of viewpoints) and viewpoint information. More specifically, the back-end server 270 generates the virtual viewpoint content on the basis of, for example, image data of a predetermined region, extracted from the images captured by the plurality of cameras 112 by a plurality of camera adapters 120, and a viewpoint designated through user operations. The back-end server 270 then provides the generated virtual viewpoint content to the end-user terminal 190. Details of the extraction of the predetermined region by the camera adapters 120 will be given later.

The virtual viewpoint content in the present embodiment is content including a virtual viewpoint image as an image obtained when an object is captured from a virtual viewpoint. In other words, the virtual viewpoint image can also be called an image that expresses the appearance from a designated viewpoint. The virtual viewpoint may be designated by the user, or may be automatically designated on the basis of the result of image analysis or the like. In other words, the virtual viewpoint image may be a desired viewpoint image corresponding to a viewpoint designated as desired by the user (a free viewpoint image), or may be an image corresponding to a viewpoint designated by the user from a plurality of candidates, an image corresponding to a viewpoint designated by the apparatus automatically, or the like. Although the present embodiment describes an example of a case where the virtual viewpoint content contains audio data, it is not absolutely necessary for audio data to be present.

The back-end server 270 may compress the virtual viewpoint image using a standard technique such as H.264 or HEVC and then transmit the encoded image to the end-user terminal 190 using the MPEG-DASH protocol. The virtual viewpoint image may instead be transmitted to the end-user terminal 190 in an uncompressed state. For example, the former compressed state assumes that the end-user terminal 190 is a smartphone or a tablet, whereas the latter uncompressed state assumes that the end-user terminal 190 is a display capable of displaying uncompressed images. In this manner, the apparatus may be capable of switching the image format in accordance with the type of the end-user terminal 190. Additionally, the image transmission protocol is not limited to MPEG-DASH, and HLS (HTTP Live Streaming) or another transmission method may be used instead, for example.

In this manner, the image processing system 100 has three function domains, namely an image collection domain, a data saving domain, and an image generation domain. The image collection domain includes the sensor systems 110a to 110z, the data saving domain includes the database 250, the front-end server 230, and the back-end server 270, and the image generation domain includes the virtual camera operation UI 330 and the end-user terminal 190. The configuration is not limited thereto, however, and the virtual camera operation UI 330 may obtain images from the sensor systems 110a to 110z directly, for example. In the present embodiment, a method in which a data saving function is provided partway through is used instead of a method of obtaining the images directly from the sensor systems 110a to 110z. Specifically, the front-end server 230 converts the image data, audio data, and metadata for those pieces of data, generated by the sensor systems 110a to 110z, into a common schema and data format for the database 250. Thus even if the cameras 112 of the sensor systems 110a to 110z are changed to other camera models, the front-end server 230 can accommodate the change resulting from the model change and register the change in the database 250. This makes it possible to reduce the risk that the virtual camera operation UI 330 will cease functioning properly if the cameras 112 are changed to other camera models.

Additionally, in the first embodiment, the virtual camera operation UI 330 is configured to access the database 250 not directly, but through the back-end server 270 instead. The back-end server 270 carries out common processing pertaining to image generation processing, whereas the virtual camera operation UI 330 carries out differential parts of applications pertaining to an operation UI. As such, when developing the virtual camera operation UI 330, particular attention can be placed on developing UI operation devices, responding to the functional demands of UIs for manipulating the virtual viewpoint images to be generated, and so on. Additionally, the back-end server 270 can add or remove common processing pertaining to the image generation processing in response to requests from the virtual camera operation UI 330. This makes it possible to response to requests from the virtual camera operation UI 330 in a flexible manner.

Thus in the image processing system 100, the back-end server 270 generates a virtual viewpoint image on the basis of image data, which is based on capturing by the plurality of cameras 112 for capturing an object from a plurality of directions. Note that the image processing system 100 according to the present embodiment is not necessarily limited to the physical configuration described thus far, and may be configured logically.

Figure 2:
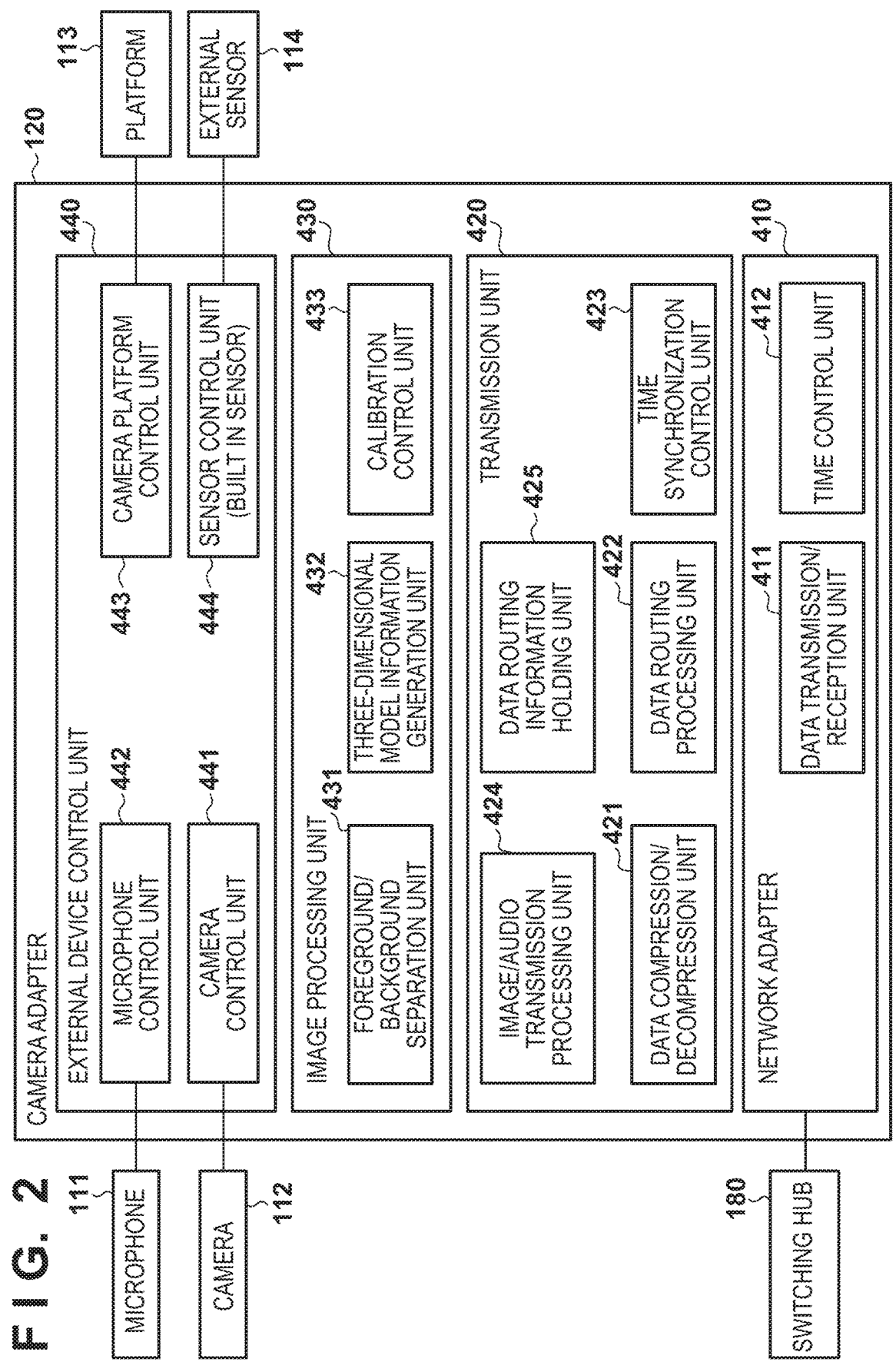
FIG. 2 is a block diagram illustrating an example of the functional configuration of a camera adapter 120.

The function blocks of the camera adapter 120 according to the present embodiment will be described next using FIG. 2. The camera adapter 120 includes a network adapter 410, a transmission unit 420, an image processing unit 430, and an external device control unit 440.

The network adapter 410 includes a data transmission/reception unit 411 and a time control unit 412. The data transmission/reception unit 411 transmits and receives data with other camera adapters 120 over the daisy chains 170. The camera adapters in the first and last daisy chains 170 (120a and 120z) carry out data communication with the front-end server 230, the time server 290, and the control station 310 over the networks 180a and 180b. For example, the data transmission/reception unit 411 outputs, to another camera adapter 120, a foreground image and a background image obtained by a foreground/background separation unit 431 separating the captured image from the camera 112. Here, the destination camera adapter 120 is the camera adapter 120, among the camera adapters 120 in the image processing system 100, that is next in a predetermined order based on processing carried out by a data routing processing unit 422. When each camera adapter 120 outputs a foreground image and a background image, a virtual viewpoint image is generated on the basis of foreground images and background images captured from a plurality of viewpoints. Note that camera adapters 120 that output a foreground image separated from a captured image but do not output a background image may be present as well.

The time control unit 412 has a function for saving a timestamp of data exchanged with the time server 290 and a function for time synchronization with the time server 290, based on OrdinayClock in the IEEE 1588 standard, for example. Note that the standard is not limited to IEEE 1588, and the time synchronization with the time server 290 may be achieved using another EtherAVB standard or a proprietary protocol. A NIC (Network Interface Card) is used as the network adapter 410 in the present embodiment, but the adapter is not limited to a NIC, and another similar interface may be used. IEEE 1588 has been updated to IEEE 1588-2002, IEEE 1588-2008, and so on as basic standards, and the latter is also referred to as PTPv2 (Precision Time Protocol Version 2).

The transmission unit 420 has a function for controlling the transmission of data to the switching hub 180 and the like via the network adapter 410, and includes the following functional units.

A data compression/decompression unit 421 has a function for compressing data transmitted/received via the data transmission/reception unit 411 using a predetermined compression method, compression rate, and framerate, and a function for decompressing compressed data.

The data routing processing unit 422 determines a routing destination for data received by the data transmission/reception unit 411 and data processed by the image processing unit 430, using data held by a data routing information holding unit 425, which will be described later. The data routing processing unit 422 furthermore has a function for transmitting data to the determined routing destination. It is preferable to use the camera adapters 120 corresponding to the cameras 112 focused on the same gaze point as the routing destination, in terms of carrying out image processing. This is because doing so increases the image frame correlation among the cameras 112. The order of the camera adapters 120 in the image processing system 100 that output the foreground images, background images, and so on in relay format is determined in accordance with the determination made by the data routing processing unit 422 in each of the plurality of camera adapters 120.

A time synchronization control unit 423 has a function for carrying out processing pertaining to time synchronization with the time server 290, on the basis of the IEEE 1588 standard PTP (Precision Time Protocol). Note that the protocol is not limited to PTP, and the time synchronization may be achieved using another similar protocol.

An image/audio transmission processing unit 424 has a function for creating a message for transmitting image data or audio data to another camera adapter 120 or the front-end server 230 via the data transmission/reception unit 411. The message includes the image data or audio data and metadata for each type of data. In the present embodiment, the metadata includes a time code or sequence number for when the image was captured or the audio was sampled, the data type, and identifiers indicating the individual camera 112 or microphone 111. Note that the transmitted image data or audio data may be compressed by the data compression/decompression unit 421. The image/audio transmission processing unit 424 also receives messages from other camera adapters 120 via the data transmission/reception unit 411. Then, in accordance with the data type included in the message, the image/audio transmission processing unit 424 restores the data information, which is fragmented into packets of a size defined by the transmission protocol, into image data or audio data. When restoring the data, if the data is compressed, the data compression/decompression unit 421 carries out a decompression process.

The data routing information holding unit 425 has a function for holding address information used to determine the transmission destination of the data transmitted/received by the data transmission/reception unit 411.

The image processing unit 430 has a function for processing image data captured by the camera 112 and image data received from other camera adapters 120, under the control of a camera control unit 441. The image processing unit 430 includes the foreground/background separation unit 431, a three-dimensional model information generation unit 432, and a calibration control unit 433.

The foreground/background separation unit 431 has a function for separating image data captured by the camera 112 into a foreground image and a background image. In other words, the foreground/background separation unit 431 extracts the predetermined region from the image captured by the corresponding camera 112 among the plurality of cameras 112 (the camera 112 connected to that camera adapter 120). The predetermined region is, for example, a foreground image obtained as a result of detecting an object in the captured image, and the foreground/background separation unit 431 separates the captured image into a foreground image and a background image as a result of this extraction. The object is a person, for example. However, the object may be a specific person (a player, a manager, and/or a referee), or may be an object having a predetermined image pattern, such as a ball, a goal, or the like. A moving object may be detected as the object. Carrying out the process for separating the foreground image, which includes important objects such as persons, from the background region, which does not include such objects, makes it possible to improve the quality of the image in the part corresponding to the object in the virtual viewpoint image generated by the image processing system 100. Additionally, because each of the plurality of camera adapters 120 separate the foreground from the background, the load on the image processing system 100 can be distributed among the plurality of cameras 112 included in the system. Note that the predetermined region is not limited to the foreground image, and may be the background image, for example.

The three-dimensional model information generation unit 432 has a function for generating image information pertaining to a three-dimensional model under the principles of a stereo camera, for example, by using the foreground image obtained through the separation by the foreground/background separation unit 431 and a foreground image received from another camera adapter 120.

The calibration control unit 433 has a function for obtaining image data necessary for calibration from the camera 112 via the camera control unit 441 and transmitting that data to the front-end server 230, which carries out computation processing pertaining to calibration. Although the computation processing pertaining to calibration is carried out by the front-end server 230 in the present embodiment, the node that carries out the computation processing is not limited to the front-end server 230. For example, another node such as the control station 310 or the camera adapter 120 (including other camera adapters 120) may carry out the computation processing. The calibration control unit 433 also has a function for carrying out calibration during capturing in accordance with pre-set parameters (dynamic calibration) for the image data obtained from the camera 112 via the camera control unit 441.

The external device control unit 440 has a function for controlling devices connected to the camera adapter 120. The external device control unit 440 includes the camera control unit 441, a microphone control unit 442, a camera platform control unit 443, and a sensor control unit 444 as function blocks.

The camera control unit 441 has a function for connecting to the camera 112 and controlling the camera 112, obtaining captured images, providing synchronization signals, setting the time, and so on. The control of the camera 112 includes, for example, setting and referring to capturing parameters (settings for number of pixels, color depth, framerate, white balance, and so on), obtaining the state of the camera 112 (capturing, stopped, syncing, error, and so on), instructions to start and stop capturing, adjust focus, and the like. Although the focus is adjusted through the camera 112 in the present embodiment, if the camera 112 is equipped with a removable lens, the camera adapter 120 may be connected to the lens, and the camera adapter 120 may make lens adjustments, such as zoom and focus, directly. The camera adapter 120 may make lens adjustments, such as zoom and focus, through the camera 112 as well.

The provision of the synchronization signal may be carried out by the time synchronization control unit 423 providing a capturing timing (control clock) to the camera 112 using a time synchronized with the time server 290. The time setting is carried out by the time synchronization control unit 423 providing a time synchronized with the time server 290 using a time code based on the SMPTE 12M format, for example. This makes it possible to add the provided time code to the image data received from the camera 112. Note that the time code format is not limited to SMPTE 12M, and may be another format instead. Additionally, the camera control unit 441 may itself add a time code to the image data received from the camera 112, rather than providing the time code to the camera 112.

The microphone control unit 442 has a function for connecting to the microphone 111, controlling the microphone 111, starting and stopping recording, obtaining recorded audio data, and so on. The control of the microphone 111 is gain adjustment, obtaining states, and so on, for example. Like the camera control unit 441, the microphone control unit 442 provides the timing at which to sample audio, and a time code, to the microphone 111. Time information from the time server 290 is converted into, for example, a 48-KHz word clock and supplied to the microphone 111 as clock information to serve as the timing for sampling the audio.

The camera platform control unit 443 has a function for connecting to the camera platform 113 and controlling the camera platform 113. The control of the camera platform 113 is, for example, pan/tilt control, obtaining a pan/tilt state, and so on.

The sensor control unit 444 has a function for connecting to the external sensor 114 and obtaining sensor information sensed by the external sensor 114. If, for example, a gyrosensor is used as the external sensor 114, information expressing vibrations (vibration information) can be obtained. Using the vibration information obtained by the sensor control unit 444, the image processing unit 430 can generate an image in which vibrations are suppressed prior to the processing carried out by the foreground/background separation unit 431. For example, this is used when, in light of the vibration information, image data from an 8K camera is cut to a size smaller than the original 8K size and is then positioned relative to the image from the adjacent camera 112. Thus even if vibrations from the skeleton of a structure are transmitted to the cameras at different frequencies, positioning can be carried out using the above-described functions provided in the camera adapter 120. As a result, electronically-stabilized image data can be generated, and an effect can be achieved in which the processing load for positioning equivalent to the number of cameras 112 can be lightened for the image computing server 200. Note that the sensor in the sensor system 110 is not limited to the external sensor 114, and the sensor may be built into the camera 112 or the camera adapter 120, for example.

Figure 5:
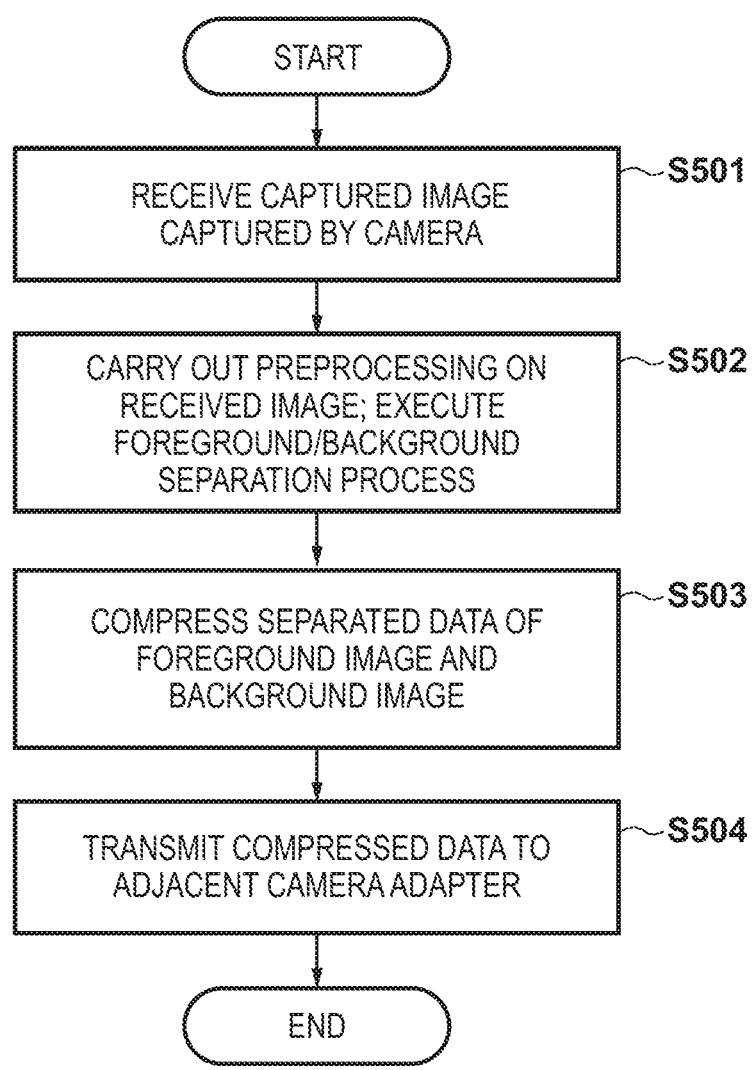
FIG. 5 is a flowchart illustrating the generation and transfer of foreground/background images.

Next, a process through which a camera adapter 120 generates the foreground image and the background image and transmits those images to the next camera adapter 120 will be described with reference to the flowchart in FIG. 5.

The camera control unit 441 obtains the captured image from the camera 112 connected to that camera control unit 441 (S501). Next, the foreground/background separation unit 431 separates the captured image obtained in S501 into a foreground image and a background image (S502). In the present embodiment, the foreground image is an image determined on the basis of a result of detecting a predetermined object in the captured image obtained from the camera 112. The predetermined object is a person, for example. However, the object may be a specific person (a player, a manager, and/or a referee), or may be an object having a predetermined image pattern, such as a ball, a goal, or the like. A moving object may be detected as the object.

Next, the data compression/decompression unit 421 compresses the separated foreground image and background image (S503). Lossless compression is carried out on the foreground image so that the foreground image remains at high quality. Lossy compression is carried out on the background image to reduce the amount of data transmitted. Next, the image/audio transmission processing unit 424 transmits the compressed foreground image and background image to the next camera adapter 120 via the data transmission/reception unit 411 (S504). Rather than transmitted every frame of the background image, the frames to be transmitted may be thinned before transmission. For example, if the captured image is 60 fps, every frame of the foreground image is transmitted, but only one frame, out of the 60 frames per second, of the background image is transmitted. This has a special effect of making it possible to further reduce the amount of transmitted data.

The image/audio transmission processing unit 424 may add metadata when transmitting the foreground image and the background image to the next camera adapter 120. For example, an identifier of the camera adapter 120 or the camera 112, the position (xy coordinates) of the foreground image within the frame, the data size, the frame number, the capturing time, and the like can be added as metadata. Gaze point group information for identifying the gaze point, data type information identifying the foreground image and the background image, and the like may be added as metadata as well. However, the content of the data added as metadata is not limited to these, and other data may be added as well.

Note that when the camera adapter 120 transmits data over a daisy chain, the transmission processing load on the camera adapter 120 can be lightened by selectively processing only the images captured by cameras 112 having high correlations with the camera 112 to which that camera adapter 120 is connected. A level of robustness can also be ensured by configuring the system so that data transmission between camera adapters 120 does not stop even if a malfunction arises in one of the camera adapters 120 during the daisy chain transmission.

Figure 7:
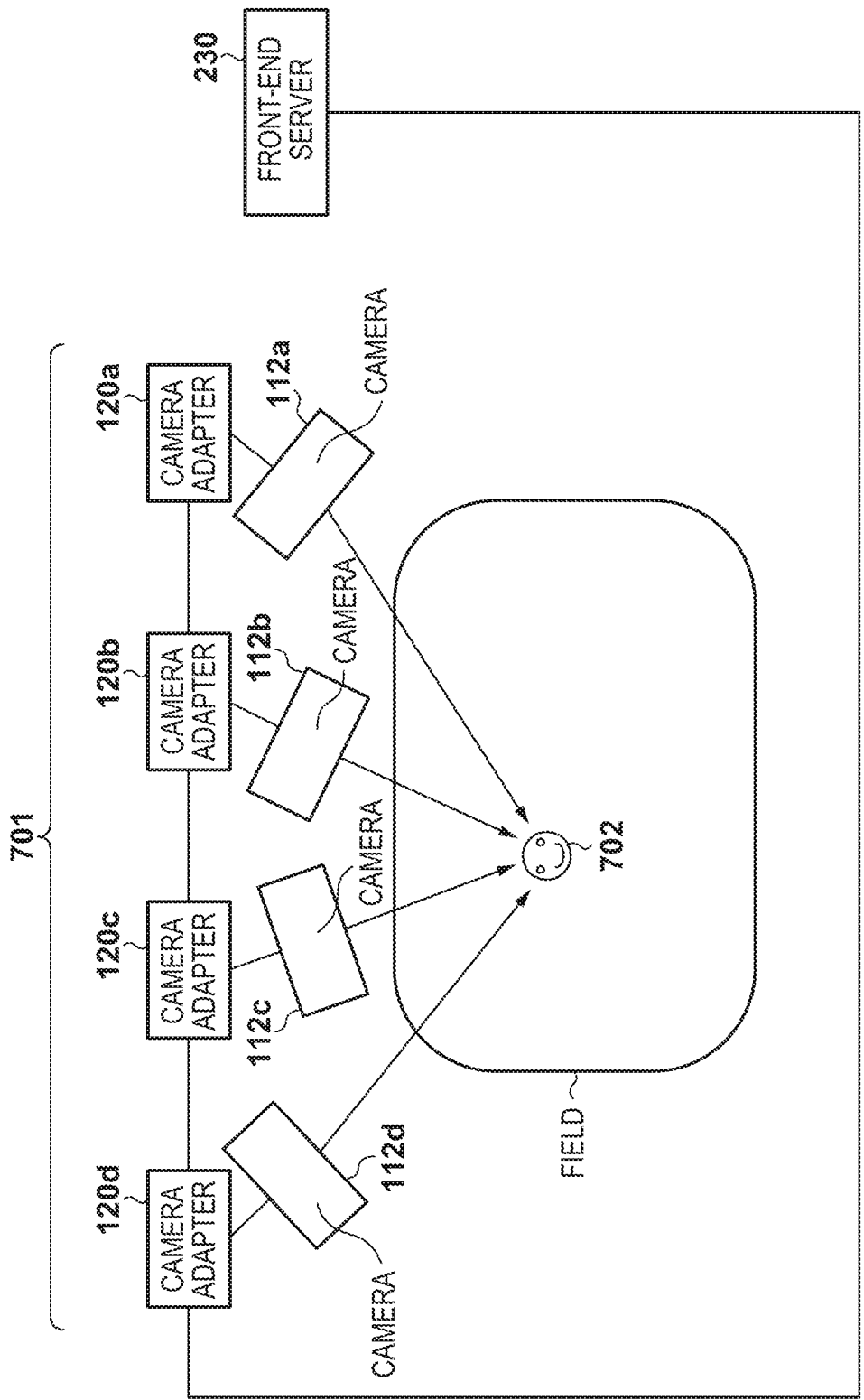
FIG. 7 is a diagram illustrating an example of the arrangement of cameras and camera adapters.

FIG. 7 is a diagram illustrating a gaze point and a camera arrangement according to the present embodiment. Each camera 112 is installed so that the optical axis thereof faces a specific gaze point 702. The cameras 112 assigned to the same gaze point group 701 are installed facing the same gaze point 702.

First, a processing sequence under normal circumstances, in which a plurality of camera adapters 120 (120a, 120b, 120c, and 120d) operate in tandem, will be described using FIG. 3. Note that the order of the processing is not limited to the order illustrated in the drawing. Additionally, although 26 cameras 112 and camera adapters 120 are present in the image processing system 100 illustrated in FIG. 1, the descriptions here focus on two of the cameras (112b and 112c) and four of the camera adapters (120a, 120b, 120c, and 120d). The camera 112b is connected to the camera adapter 120b, and the camera 112c is connected to the camera adapter 120c. Note that the cameras connected to the camera adapter 120a and the camera adapter 120d (112a and 112d), the microphone 111, the camera platform 113, and the external sensor 114 connected to each camera adapter 120, and the like are not illustrated. It is also assumed that the time synchronization with the time server 290 is complete for the camera adapters 120a to 120d, and the camera adapters are in a capturing state.

At a synchronized capturing timing (time t), the camera 112b and the camera 112c transmit a captured image (1) and a captured image (2) to the camera adapters 120b and 120c, respectively (F301 and F302). The camera adapters 120b and 120c carry out a calibration process on the received captured image (1) or captured image (2) using the calibration control units 433 (F303 and F304). The calibration process is, for example, color correction, stabilization, and the like. Although the calibration process is carried out in the present embodiment, the calibration process does not absolutely have to be carried out. Next, the foreground/background separation units 431 carry out a foreground/background separation process on the calibrated captured image (1) or captured image (2) (F305 and F306).

Next, the data compression/decompression units 421 compress the separated foreground images and background images (F307 and F308). Note that the compression rate may be changed for the separated foreground images and background images in accordance with the levels of importance thereof. In some cases, no compression need be applied. For example, out of the foreground image and the background image, a camera adapter 120 may compress at least the background image so that the compression rate of the foreground image is lower than the background image, and then output the images to the next camera adapter 120. If both the foreground image and the background image are to be compressed, lossless compression is carried out on the foreground image, which includes an important capturing subject, whereas the lossy compression is carried out on the background image, which does not include a capturing subject. This makes it possible to efficiently reduce the amount of data transmitted to the next camera adapter 120c or the camera adapter 120d thereafter. For example, when capturing the field in a stadium where a soccer, rugby, baseball, or other game is being held, most of the image tends to be constituted by the background image, whereas the area of the foreground image, including the players and the like, tends to be small, and thus the amount of data transmitted can be greatly reduced.

Furthermore, the camera adapter 120b or the camera adapter 120c may change the framerate of the images output to the next camera adapter 120c or the camera adapter 120d in accordance with the level of importance. For example, the foreground image, which includes an important capturing subject, may be output at a high framerate, and the background image, which does not include a capturing subject, may be output at a low framerate, so that the output framerate of the background image is lower than that of the foreground image. This makes it possible to further reduce the amount of data transmitted to the next camera adapter 120c or the camera adapter 120d. The compression rate, transmission framerate, and the like may be changed for each camera adapter 120 in accordance with the installation location of the camera 112, the capturing location, and/or the capabilities of the camera 112. Three-dimensional structures such as stadium seating can also be confirmed in advance using diagrams, and thus the camera adapters 120 may transmit the background images with the parts corresponding to the seating removed. As a result, using the three-dimensional structure of the stadium generated in advance when rendering (described later) makes it possible to carry out image rendering with emphasis on the players in the game, providing an effect that the amount of data that is transmitted and stored in the system as a whole can be reduced.

Next, each camera adapter 120 transmits the compressed foreground image and background image to the adjacent camera adapter 120 (F310, F311, and F312). Although the foreground image and the background image are transmitted simultaneously in the present embodiment, the images may be transmitted individually instead.

Next, the camera adapter 120b transmits the foreground image and the background image received from the camera adapter 120a to the camera adapter 120c (F315). Likewise, the camera adapter 120c transmits the foreground image and the background image to the camera adapter 120d. Although the foreground image and the background image are transmitted simultaneously in the present embodiment, the images may be transmitted individually instead. The camera adapter 120c transmits the foreground image and the background image, created by the camera adapter 120b and received from the camera adapter 120b, the camera adapter 120d (F316). Furthermore, the camera adapter 120c transmits the foreground image and the background image, created by the camera adapter 120a and received from the camera adapter 120b, to the camera adapter 120d (F317).

Figure 4:
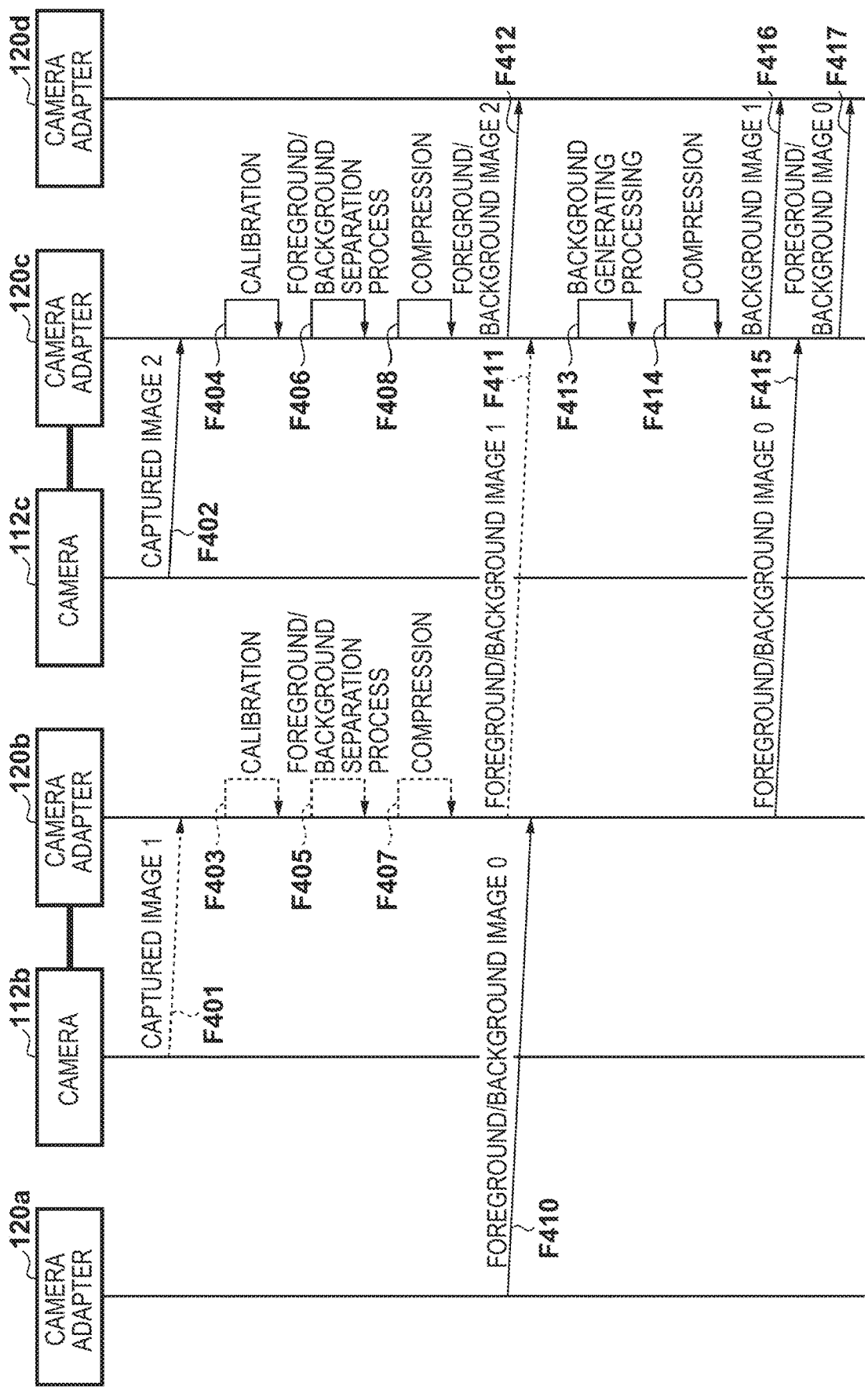
FIG. 4 is a sequence chart illustrating the generation and transmission of foreground/background images during a malfunction.

Next, a processing sequence carried out when the camera adapter 120b has malfunctioned, in which a plurality of camera adapters 120 (120a, 120b, 120c, and 120d) operate in tandem, will be described using FIG. 4. Note that the order of the processing is not limited to the order illustrated in the drawing. Note that in FIG. 4, it is assumed that the time synchronization with the time server 290 is complete for the camera adapters 120a to 120d, and the camera adapters are in a capturing state. Furthermore, FIG. 4 illustrates a case where a captured image cannot be obtained from the camera 112b or the camera adapter 120b due to one of those elements malfunctioning or the like. The following descriptions will assume that the camera adapter 120b has malfunctioned.

At a synchronized capturing timing (time t), the camera 112b and the camera 112c transmit a captured image (1) and a captured image (2) to the camera adapters 120b and 120c, respectively (F401 and F402). Because the camera adapter 120b has malfunctioned, the captured image (1) cannot be received from the camera 112b, and the calibration process cannot be carried out in the calibration control unit 433 (F403). Additionally, the foreground/background separation unit 431 cannot carry out the foreground/background separation process (F405). Furthermore, the data compression/decompression unit 421 cannot compress the foreground image and the background image (F407). Further still, because the foreground/background images (1) cannot be generated, the camera adapter 120b cannot transmit those images to the camera adapter 120c (F411).

On the other hand, in the camera adapter 120c, the calibration control unit 433 carries out the calibration process on the captured image (2) received from the camera 112c (F404). Additionally, in the camera adapter 120c, the foreground/background separation unit 431 carries out the foreground/background separation process on the calibrated captured image (2) (F406). Furthermore, the data compression/decompression unit 421 compresses the separated foreground image and background image (F408). Further still, the image/audio transmission processing unit 424 and the data transmission/reception unit 411 transmit the compressed foreground/background images (2) to the camera adapter 120d (F412). The operations in F410, F415, and F416 are the same as in F310, F315, and F316 of FIG. 3.

In addition to the images captured by the cameras 112b and 112c connected thereto, the camera adapters 120b and 120c transmit the foreground/background images transmitted between the other camera adapters to the camera adapters 120c and 120d, respectively. However, if, as described above, the camera adapter 120b has malfunctioned or the like and the camera adapter 120b cannot receive the captured image (1) from the camera 112b, the foreground/background images (1) cannot be generated. Accordingly, the foreground/background images (1) cannot be transmitted to the camera adapter 120c from the camera adapter 120b.

If the camera adapter 120c cannot receive the foreground/background images (1) from the camera adapter 120b within a predetermined amount of time after time t, the foreground/background separation unit 431 of the camera adapter 120c generates a replacement background image (1) from the image captured by the camera 112c (F413). The data compression/decompression unit 421 then compresses the generated background image (1) (F414). The compressed background image (1) is transmitted to the camera adapter 120d by the image/audio transmission processing unit 424 and the data transmission/reception unit 411 (F416). Although replacement images may be generated and transmitted for both the foreground image and the background image, only a replacement background image is generated and transmitted in the present embodiment. The reason for this is as follows.

Figure 8:
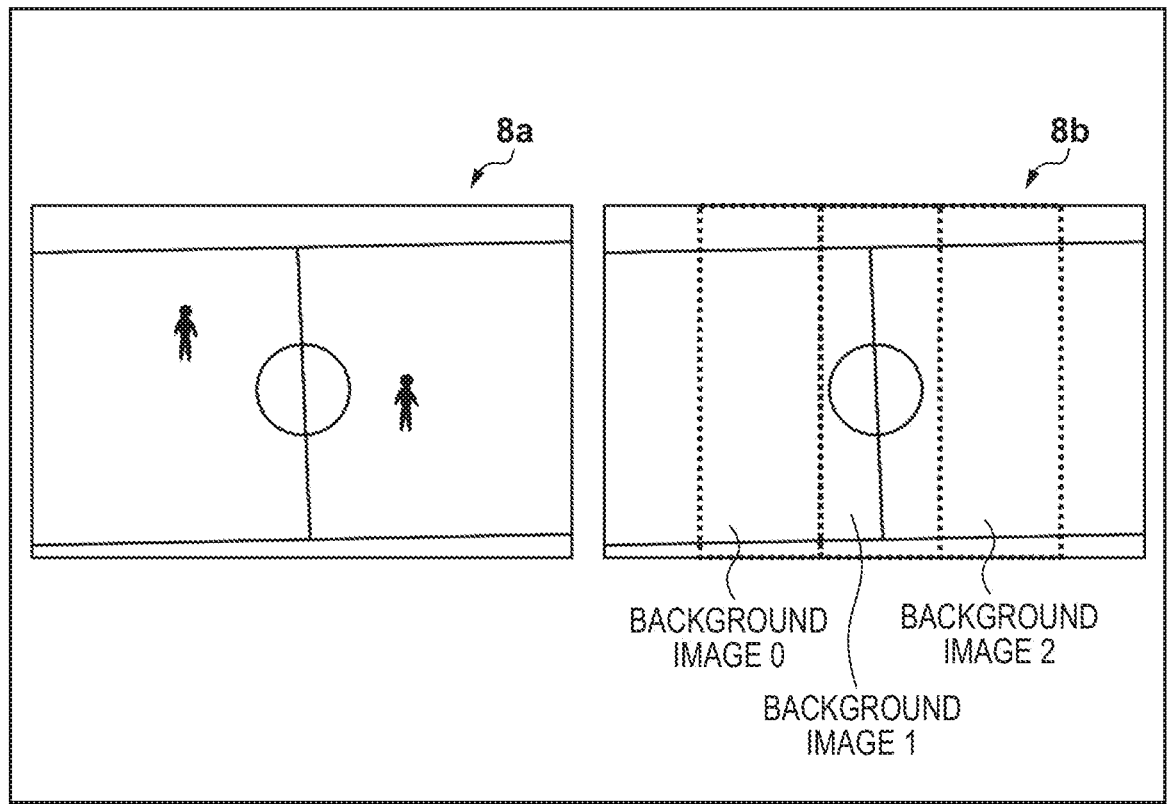
FIG. 8 is a diagram illustrating a captured image from a camera and a background image.

The captured image, and the background image (0), the background image (1), and the background image (2), will be described first. 8*a* in FIG. 8 indicates the captured image, and 8*b* in FIG. 8 indicates the transmitted background images. There is little movement in the background image, and large overlapping parts among the cameras 112*a*, 112*b*, 112*c*, and 112*d*. Accordingly, the background images are transmitted to the next stage with the overlapping parts removed, so that only the differences remain. The rectangular background images indicated by 8*b* in FIG. 8 indicate the differences between the background images obtained from the different cameras. Under normal circumstances, the camera adapter 120*b* generates the background image (1) from the captured image (1) transmitted from the camera 112*b*, but when the camera 112*b* malfunctions, the background image (1) is generated from the captured image (2) temporarily held by the camera adapter 120*c*. In other words, in the present embodiment, overlapping regions are present in the capturing ranges of adjacent cameras 112. Thus even if a camera 112 has malfunctioned, the background image that should be generated from the image captured by the malfunctioning camera can instead be generated from the image captured by the camera 112 adjacent to the malfunctioning camera. In this manner, when an error is detected in at least one of the plurality of cameras, the virtual viewpoint image can be generated by using the image captured by a camera, among the plurality of cameras, for which an error has not been detected, as the image of the capturing field of the camera for which the error has been detected.

As described above, in the present embodiment, the differences between adjacent cameras are transmitted as the background images. As such, if a background image is not transmitted due to a camera malfunction, the part corresponding to the difference will be missing and cannot be supplemented from another image. However, the entire capturing range is transmitted for the foreground image, and thus the parts of the foreground image overlap as a result of the foreground images from the plurality of cameras. Thus the image can be supplemented synthetically, without generating a replacement foreground image. Meanwhile, if the transmission framerate of the background image has been reduced to reduce the amount of transmitted data as described above, and a background image is missing, that missing state will continue for a long period of time. Thus in the present embodiment, a replacement image is generated and transmitted for the background image, but no replacement image is generated for the foreground image. With respect to the background image generated as a replacement image, the entire image may be transmitted, or only the difference described above may be transmitted.

The foreground images and background images created by the camera adapters 120*a* to 120*d* are sequentially transmitted between the network-connected camera adapters 120, and are transmitted to the front-end server 230.

Figure 3:
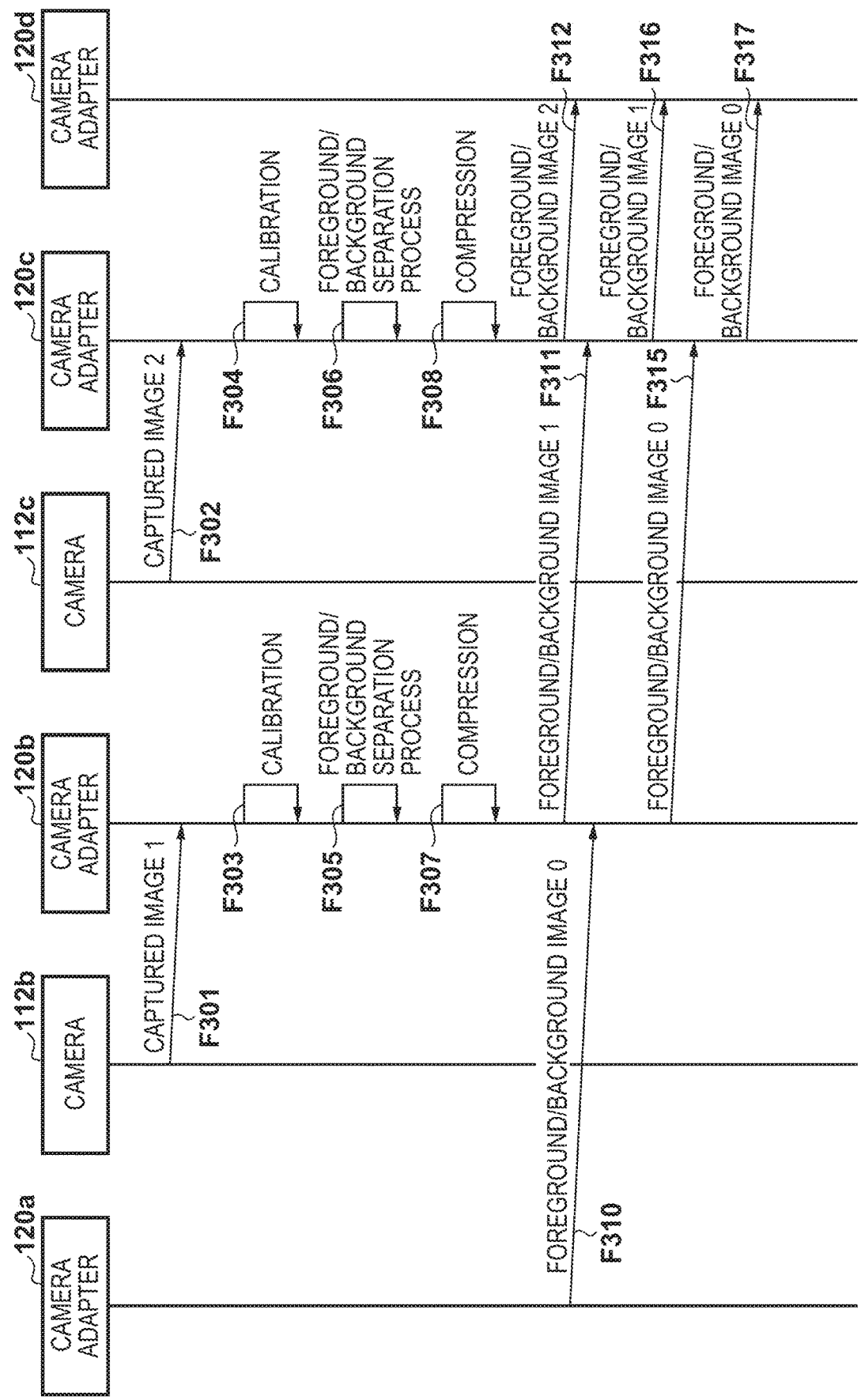
FIG. 3 is a sequence chart illustrating the generation and transmission of foreground/background images under normal circumstances.

Note that FIGS. 3 and 4 do not illustrate the calibration process, the foreground/background separation process, and the compression process carried out by the camera adapter 120*a* and the camera adapter 120*d*. However, in actuality, the camera adapter 120*a* and the camera adapter 120*d* create foreground images and background images by carrying out similar processing to the camera adapter 120*b* and the camera adapter 120*c*. Furthermore, although the data transmission sequence among four of the camera adapters 120 has been described here, the similar processing is carried out for greater numbers of camera adapters 120 as well.

Figure 6:
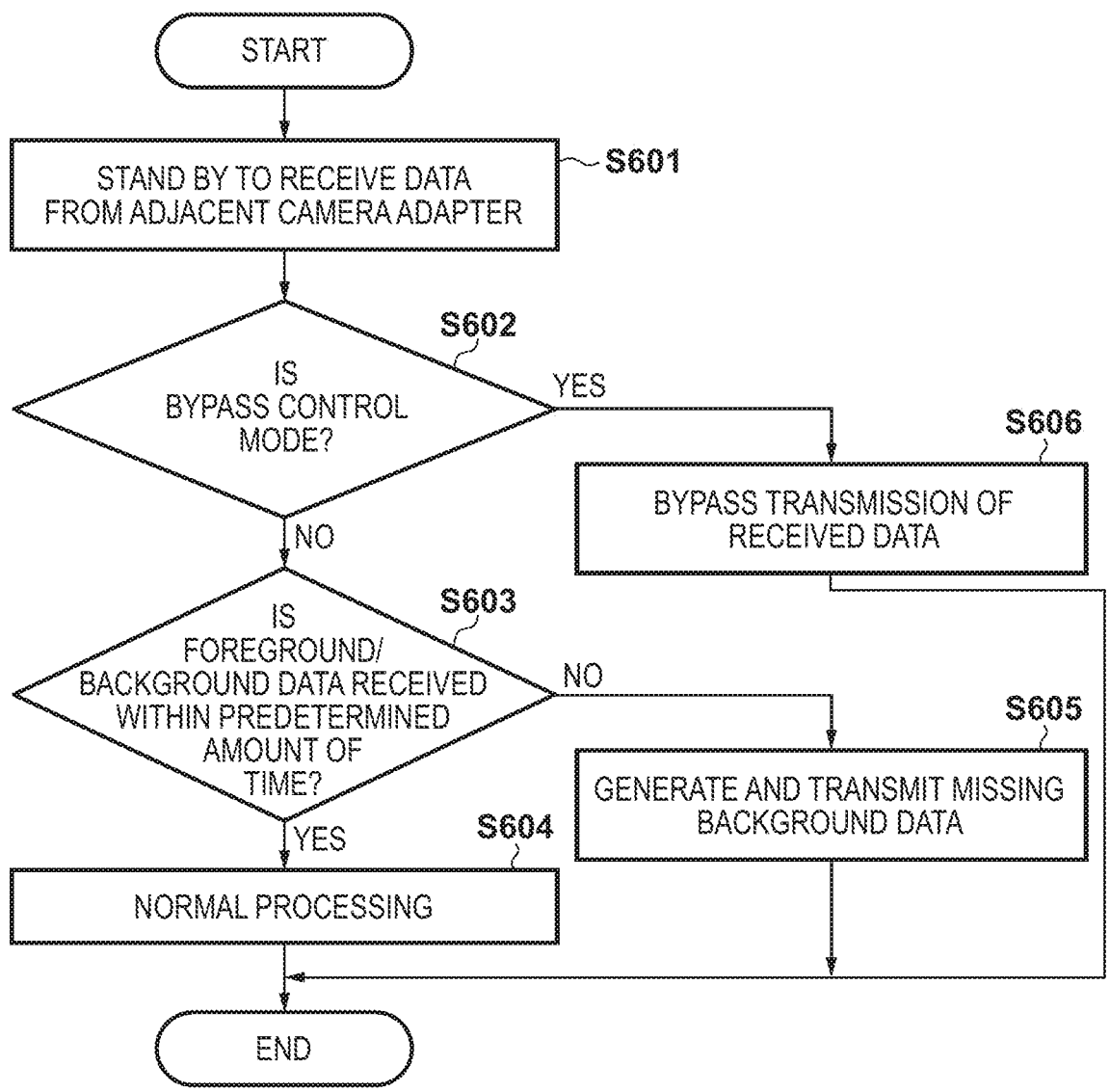
FIG. 6 is a flowchart illustrating the generation and transfer of foreground/background images.

The flow of processing carried out when a camera adapter 120 has received data from an adjacent camera adapter 120 will be described next using FIG. 6.

First, in response to a synchronization signal from the time server 290, the camera adapter 120 stands by to receive data from the adjacent camera adapter 120 (S601). The image/audio transmission processing unit 424 of the camera adapter 120 determines whether or not its own transmission mode is a bypass control mode (S602). If the mode is the bypass control mode, the image/audio transmission processing unit 424 transmits the data received from the camera adapter 120 in the previous stage to the camera adapter 120 in the next stage as-is (S606).

If the mode is not the bypass control mode, the image/audio transmission processing unit 424 determines whether or not the foreground/background images have been received from the camera adapter 120 in the previous stage within a predetermined amount of time after the corresponding camera 112 has captured an image in response to the synchronization signal and the captured image has been received (S603). If the camera adapter 120 has received the foreground/background images within the predetermined amount of time, the normal processing indicated in F316 and F317 of FIG. 3, for example, is carried out (S604). If the foreground/background images have not been successfully received within the predetermined amount of time, a malfunction is determined to have occurred, and the processing indicated in F413 to F416 of FIG. 6, for example, is carried out. In other words, the foreground/background separation unit 431 generates the background image that could not be received and is therefore missing, and the image/audio transmission processing unit 424 transmits the generated background image to the adjacent camera adapter (S605).

Figure 9:
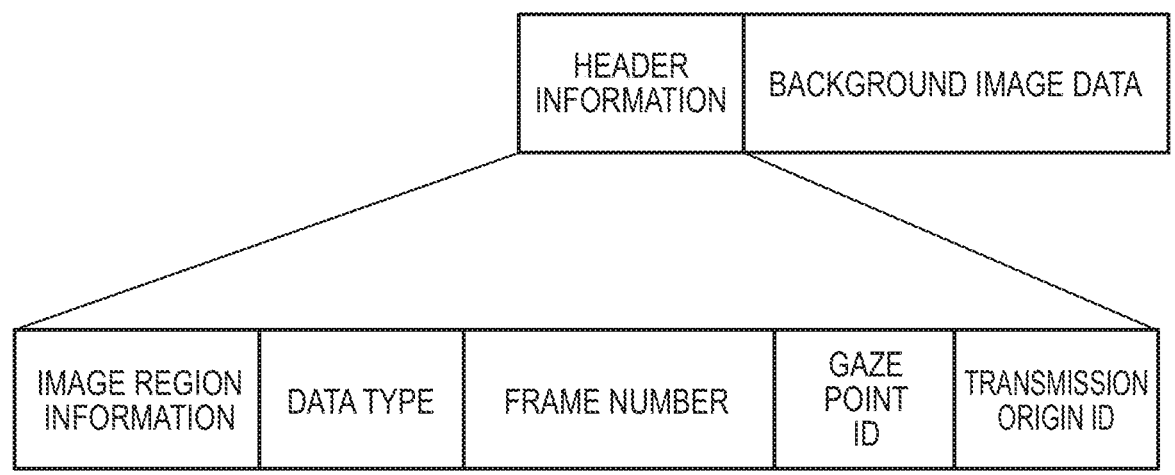
FIG. 9 is a diagram illustrating the data format of a background image.

FIG. 9 is a diagram illustrating the data format of the background image transmitted between the camera adapters 120. As illustrated in FIG. 9, the transmitted background image includes header information and background image data. The header information further includes a transmission origin ID, a gaze point ID, a frame number, a data type, and image region information. The transmission origin ID is an ID indicating the camera adapter 120 that is the source of the transmission. The gaze point ID is an ID indicating the gaze point of the camera 112 connected to the camera adapter 120 that is the source of the transmission. The frame number indicates the capturing time of the image data accompanying the header information. The data type is an ID indicating the type of the data accompanying the header information. The image region information is coordinate information indicating the range of a gaze point region in the image accompanying the header information.

The camera adapter 120 collects the coordinate information in the transmitted background image, the gaze point region of the camera 112 connected to the camera adapter 120, and so on, and calculates the coordinate information of the missing background image. The missing background image is then generated from the image captured by the camera 112. To be more specific, the camera adapter 120 determines a cutout (extraction) range in the captured image on the basis of the coordinate information of the missing background image, and generates the missing background image from the image in the cutout range that has been determined.

Although an example is described in which the coordinate information of the background image is taken from the header information and the coordinates of the missing background image are calculated, the coordinates of the background images handled by the respective cameras 112 under normal circumstances may be determined in advance. In this case, the coordinate information of the background image that must be generated can be obtained by specifying the transmission origin ID of the background image not transmitted within the predetermined amount of time.

As described above, if an image in a predetermined region is not transmitted due to a malfunction occurring in some of the plurality of cameras 112 and some of the plurality of sensor systems 110 (image processing apparatuses), the sensor system 110 in the next stage can generate the missing image and output that image to the image processing apparatus in the stage thereafter. An image processing system in which no images will go missing even if a malfunction occurs or an image processing apparatus drops out can therefore be realized. As such, according to the first embodiment, a missing background image can be supplemented even if some of the cameras 112 malfunction or lose power, and thus a virtual viewpoint image can be generated in a stable manner.

Second Embodiment

A second embodiment will be described next, from a perspective different from the first embodiment. The first embodiment describes a configuration in which a virtual viewpoint image is generated from images captured simultaneously by a plurality of cameras, and when some of the cameras malfunction or lose power, the images captured by those cameras are supplemented. In addition to generating a desired viewpoint image, generating a wide-angle image (a panoramic image) exists as another example of a technique in which a combined image is generated using images captured by a plurality of cameras. A plurality of captured images obtained by the plurality of cameras capturing images in synchronization are transmitted to and collected in a computer (server), and are then combined into a wide-angle image.

Assuming that the process from capturing the images to generating the wide-angle image is executed in real time or at a speed close thereto, efficient data transfer, high-speed computation processing, and so on are necessary to handle the large amounts of the image data. For example, transmission bandwidth can be conserved, the amount of data to be processed by the destination computer can be reduced, and so on by cutting out only the necessary area from the captured image and transmitting the partial image obtained as a result. However, in such a configuration, the image cannot be synthesized if one of the plurality of cameras fails to capture an image. This is because the transmitted image data does not cover the areas of the other cameras. Note that "failing to capture an image" refers to, for example, a case where the camera has malfunctioned or is turned off and can therefore not capture an image, a case where a user has moved significantly during consecutive capturing and the image is blurry, a case where an object exhibiting sudden movement has appeared during capturing and feature point matching cannot be achieved after the fact, and so on. The second embodiment will describe an image processing system capable of generating a wide-angle image in such a configuration, even if one of the plurality of cameras has failed to capture an image. Note that the wide-angle image generated according to the second embodiment can also be used to generate a virtual viewpoint image. In other words, the server according to the present embodiment can generate a wide-angle image from images captured by a plurality of cameras, and can then generate a virtual viewpoint image using the wide-angle image and viewpoint information pertaining to the position of a virtual viewpoint. The method for generating the virtual viewpoint image is the same as that described in the first embodiment with reference to FIG. 1.

Figure 10:
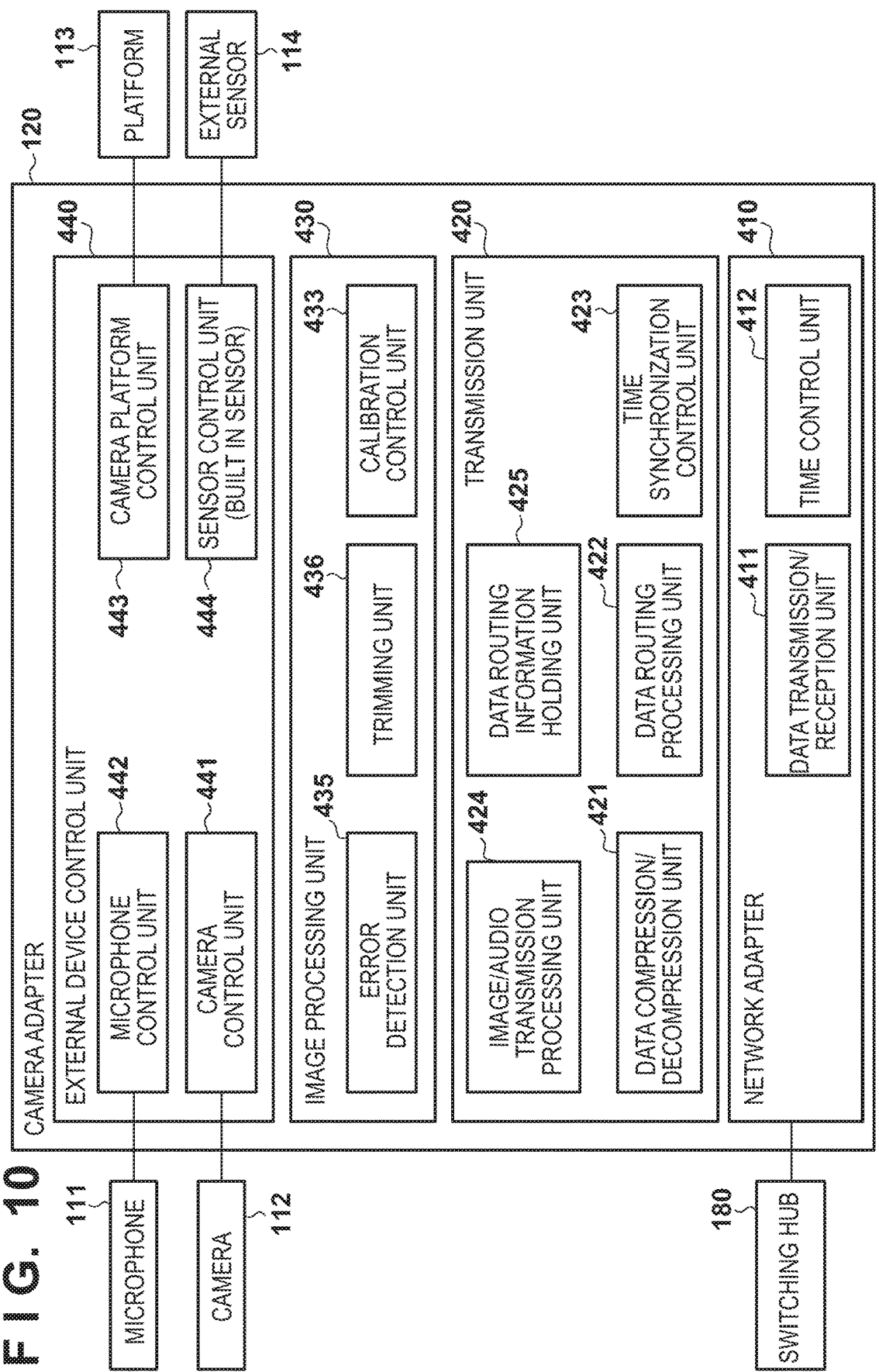
FIG. 10 is a block diagram illustrating an example of the configuration of the camera adapter 120 according to an embodiment.

The configuration of the image processing system 100 according to the second embodiment is similar to in the first embodiment (FIG. 1), but the configuration of the camera adapters 120 is different. FIG. 10 is a block diagram illustrating an example of the configuration of the camera adapters 120 in the sensor systems 110 according to the second embodiment. In FIG. 10, configurations that are the same as in the first embodiment (FIG. 2) are given the same reference signs as in FIG. 2. As illustrated in FIG. 10, in the camera adapter 120 according to the second embodiment, the image processing unit 430 is provided with an error detection unit 435 and a trimming unit 436. The error detection unit 435 detects the occurrence and presence of an error in a captured image captured by the camera 112 or a partial image obtained from the captured image to trimming. The trimming unit 436 carries out trimming for cutting a partial area, which is needed to generate the wide-angle image, out of the captured image.

As in the first embodiment, typical digital cameras or digital video cameras can be used as the cameras 112a to 112z. The cameras 112 are arranged in positions that enable the cameras to capture mutually-different view fields, and obtain digital images by capturing moving images at a predetermined framerate. Note that the capturing framerate can be selected from among 1 fps to 60 fps. However, the capturing framerate is not limited thereto. All the cameras 112 capture at the same capturing framerate and at the same timing, i.e., capture in synchronization with each other. Synchronization signals for this synchronized capturing are transmitted to the sensor systems 110 from the time server 290, for example.

Figure 11:
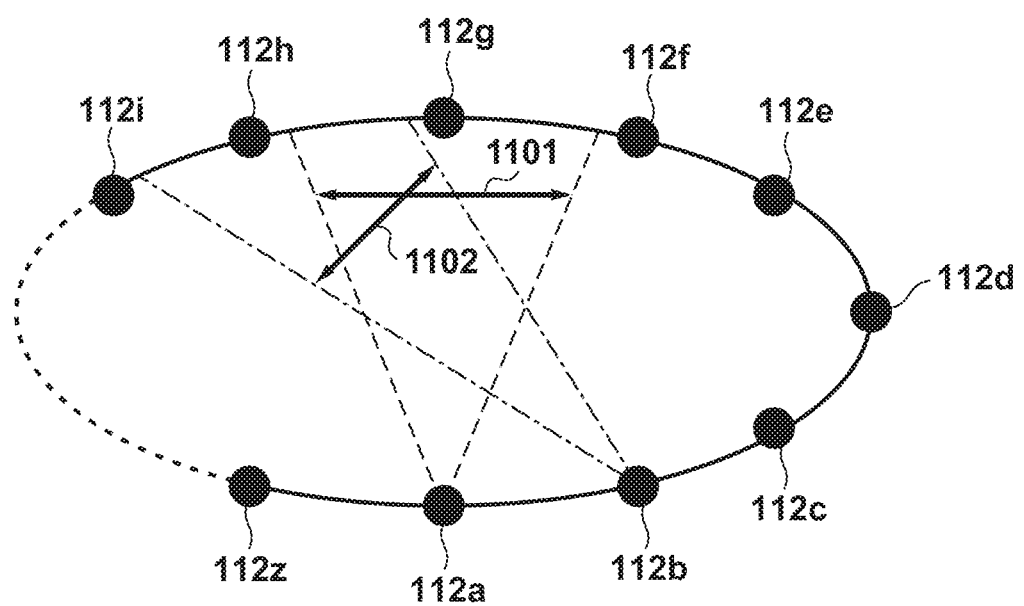
FIG. 11 is a diagram illustrating the arrangement of a plurality of image capturing units and view fields according to an embodiment.

FIG. 11 is a diagram illustrating an example of the arrangement of the cameras 112. Note, however, that the number and arrangement of the cameras are not limited to those illustrated in FIG. 11. In FIG. 11, the camera 112a captures a view field 1101, and the camera 112b captures a view field 1102. In the case of FIG. 11, a field of view corresponding to the entire circumference (360 degrees) is covered by combining the images of the different view fields captured by the cameras 112a to 112z. The trimming unit 436 of the camera adapter 120 trims the captured image so that of the view field overlapping with the cameras 112 of the other sensor systems 110, an overlapping range needed to generate the wide-angle image later remains (this will be described later with reference to FIG. 12). The image data resulting from the trimming is transmitted to the image computing server 200 (the front-end server 230) by the image/audio transmission processing unit 424 and the data transmission/reception unit 411. The purpose of the trimming is to improve the transmission efficiency. Note that the range to be trimmed is defined in advance through an image generation method by the back-end server 270 (a method for generating a wide-angle image), and is assumed to be known by each of the camera adapters 120.

As in the first embodiment, the data compression/decompression unit 421 of the camera adapter 120 carries out data compression to improve the transmission efficiency when transmitting the image data to a network unit 103. The data compression method is not particularly limited, and may be a lossless compression method such as JPEG-LS, a lossy compression method such as MPEG, or the like. The camera adapter 120z connected to the network 180b carries out processes such as packing, packet division, network header addition, and so on for transmitting the image data over the network, and transmits the image data to the network unit 103.

As in the first embodiment, the sensor systems 110 are daisy-chained to each other, and the sensor systems 110a and 110z at the ends are connected to the network. Ethernet (registered trademark), which is commonly used in the field of computer networks, can be used as the network here. The captured images captured by the cameras 112 become image data trimmed in the camera adapters 120, and are collected in the database 250 via the network 180b and the front-end server 230. Note that the network format is not particularly limited, and another network standard, such as FDDI, which is connected in a ring shape using fiber optics, InfiniBand, which is used for high-speed transmission between servers, or the like may be used.

The present embodiment assumes high-load and high-speed processing demands. The units connected to the network include NICs (Network Interface Cards) based on 10GBASE, which is a 10 Gbit Ethernet (registered trademark) standard, as network IFs, for example. Note that the 10GBASE Ethernet (registered trademark) standard is defined by IEEE (The Institute of Electrical and Electronics Engineers). Meanwhile, the database 250, which serves as a storage medium, includes an SSD (Solid State Drive), for example. A PC (Personal Computer), a WS (Workstation), or the like can be used as the image computing server 200, but the type of the apparatus is not particularly limited. A user may select the optimal network IFs, computer type, and so on in accordance with the number of cameras 112, the resolution of the data that is captured, the details of the trimming, the format of the connections with the network units, and so on.

The front-end server 230 saves the image data (rectangular images) transmitted from the sensor systems 110 in the database 250. Accordingly, the database 250 functions as an image saving unit. The back-end server 270 functions as an image generation unit that generates a wide-angle image (panoramic image) of a desired view field by synthesizing an image data group stored in the database 250 serving as the image saving unit. The back-end server 270 (the image generation unit) and the database 250 (the image saving unit) are included in the image computing server 200, and are assumed to be the same physical entity, but may be configured as separate entities.

In addition to generating panoramic images, it is assumed that the back-end server 270 also has a function for attaching 3D models to captured images. For example, a case is conceivable in which a 3D model exists for the space captured by the cameras 112, and the captured images are projected onto the planes of the 3D model as textures by finding the correspondence between the spatial coordinates of the captured images and the 3D model. In this case, it is assumed that the 3D model is stored in the image computing server 200 in advance, and the spatial positional relationship between the cameras 112 and the 3D model is known in advance.

Note that the type, operating frequency, and so on of the CPU in the image computing server 200 are not particularly limited. Additionally, a coprocessor, a GPU (Graphics Processing Unit), or the like may also be used for the purpose of accelerating the image generation. The user may select the appropriate type of device in accordance with the required speed for generating the wide-angle image.

Figure 12:
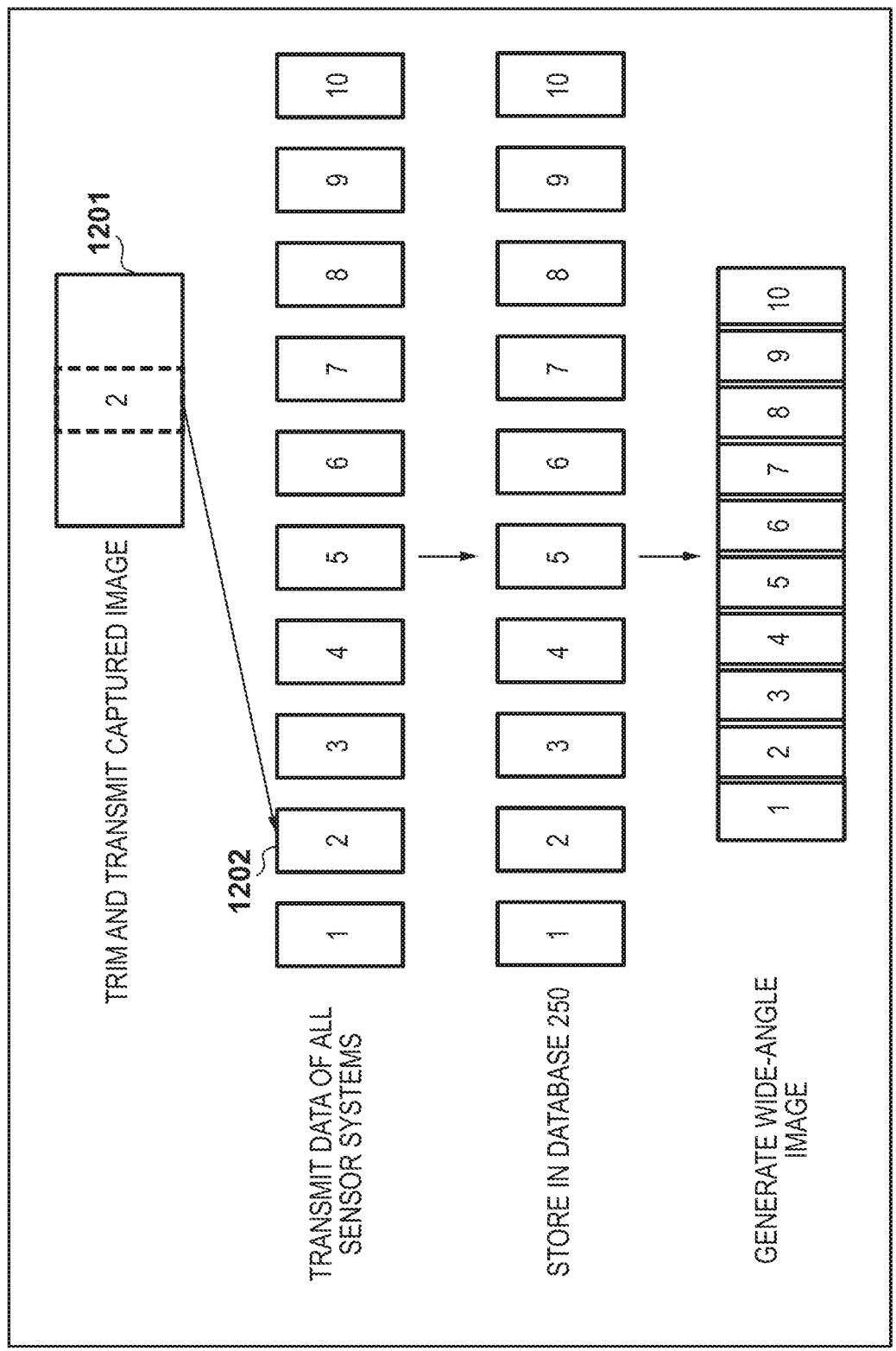
FIG. 12 is a diagram illustrating an overview from capturing an image to generating a wide-view field, according to an embodiment.

The process for generating a wide-angle image from the captured images obtained from the individual cameras 112 will be described conceptually next with reference to FIG. 12. A captured image 1201 captured by the camera 112 is trimmed to the necessary view field part in the camera adapter 120, and image data expressing a rectangular partial image (rectangular image) 1202 is generated. The partial image obtained from the trimming will be called a "rectangular image" hereinafter. However, the term "rectangular image" is only used for convenience, and the rectangular image is not limited to an image that is longer on the vertical. As indicated by the wide-angle image in the lowermost section of FIG. 12, overlapping ranges, where the rectangular images overlap with adjacent rectangular images, are provided. Although FIG. 12 illustrates ten rectangular images being used to generate the wide-angle image, the number is not limited thereto.

The rectangular images generated by the sensor systems 110a to 110y are transmitted to the sensor system 110z over the daisy chains. The sensor system 110z transmits the rectangular images obtained from all of the sensor systems, including the rectangular image it generated itself, to the front-end server 230 via the network 180b. The front-end server 230 collects and stores the transmitted rectangular images in the database 250. The back-end server 270 generates the wide-angle image using the rectangular images stored in the database 250.

If, when generating a wide-angle image as described above, an error is present in the captured images from some of the cameras, the back-end server 270 will be unable to appropriately combine the adjacent images, and as a result, a wide-angle image cannot be generated.

Figure 13:
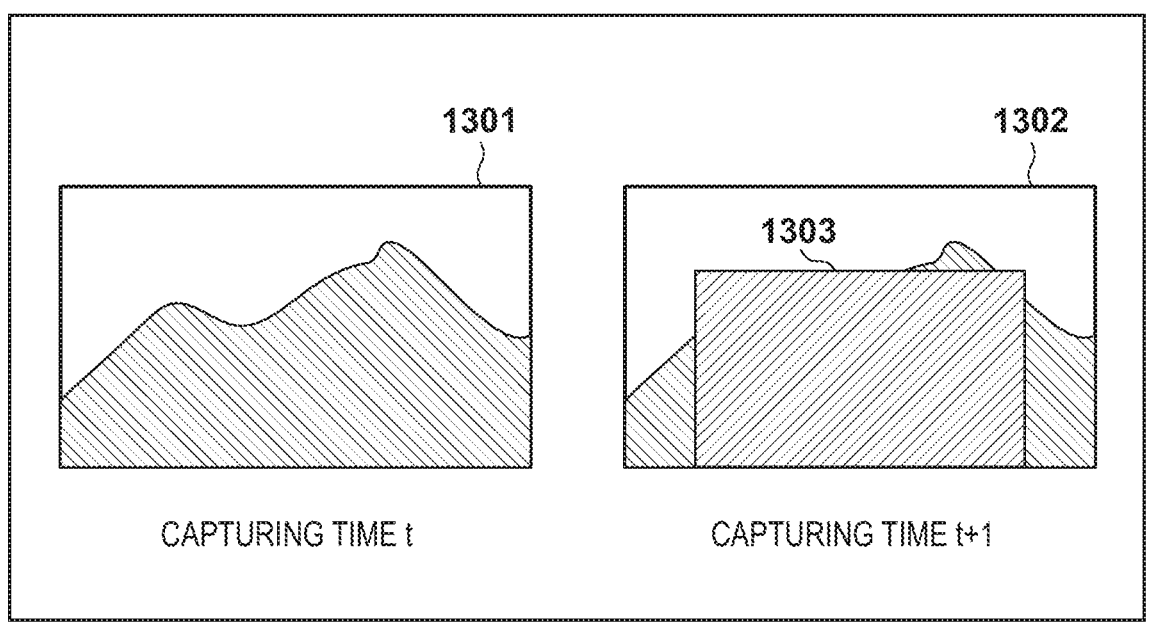
FIG. 13 is a diagram illustrating processing carried out by an error detection unit according to an embodiment.

If, for example, a camera 112 has been unable to appropriately capture an image, the error detection unit 435 of the sensor system 110 assumes that an error is present in the captured image, and detects an error. FIG. 13 illustrates an example of a captured image in which an error is present. The error detection unit 435 compares a captured image 1301, captured by the camera 112 at time t, with a captured image 1302, captured at time t+1. Here, time t+1 is the capturing timing of the next synchronized capturing after the synchronized capturing carried out at time t. Comparing the captured image 1301 with the captured image 1302 at the pixel level, a region 1303 is significantly different. In this case, the error detection unit 435 detects that an error is present in the captured image if the captured image has changed by greater than or equal to a given threshold, and transmits an error notification to the camera adapter 120. The region 1303, which is different between the captured image 1301 and the captured image 1302, is assumed to be the result of some kind of object being placed in front of the camera 112, for example. The same also applies when the camera 112 itself has malfunctioned and was unable to correctly capture the region 1303.

Note that the method for detecting an error is not limited to the above-described method, and various other methods are conceivable as well. For example, although the foregoing describes comparing the image at the pixel level, the comparison may be carried out not for all the pixels, but rather for pixels resulting from a thinning process. Furthermore, instead of using the pixels themselves, a histogram of the image data may be continually obtained, and the determination as to whether an error is present in the captured image may be made from the histogram. Additionally, the camera 112 itself may have a function for analyzing its own captured image, and may set an error flag in metadata added to the captured image when an error has arisen in the captured image. In this case, the error detection unit 435 detects the occurrence of an error on the basis of the error flag. Alternatively, an error in the captured image may be detected by comparing the images from cameras 112 that are close to each other and have neighboring view fields.

When a notification that an error has been detected is received from the sensor system 110 in the previous stage, the camera adapter 120 changes the output image, i.e., the rectangular image, by changing the trimming range for the captured image from the camera 112. In the case where the trimming range cannot be changed for a captured image obtained under normal capturing conditions, the angle of view and/or capturing direction of the camera 112 is changed.

The changing of the rectangular image (the trimming range) will be described using FIG. 14. Here, there are ten cameras 112. A rectangular image of a region 1403 is cut out (extracted) from a captured image 1401 captured by the camera 112 handling a rectangle 3, and the rectangular image of a region 1404 is cut out from a captured image 1402 captured by the camera 112 handling a rectangle 4. As indicated by 14*a* in FIG. 14, when there is no error in the captured image (under normal circumstances), a rectangular image of the region 1403 is transmitted from the camera adapter 120 of the camera 112 that handles the rectangle 3. A rectangular image of the region 1404 is transmitted from the camera adapter 120 of the camera 112 that handles the rectangle 4.

Figure 14:
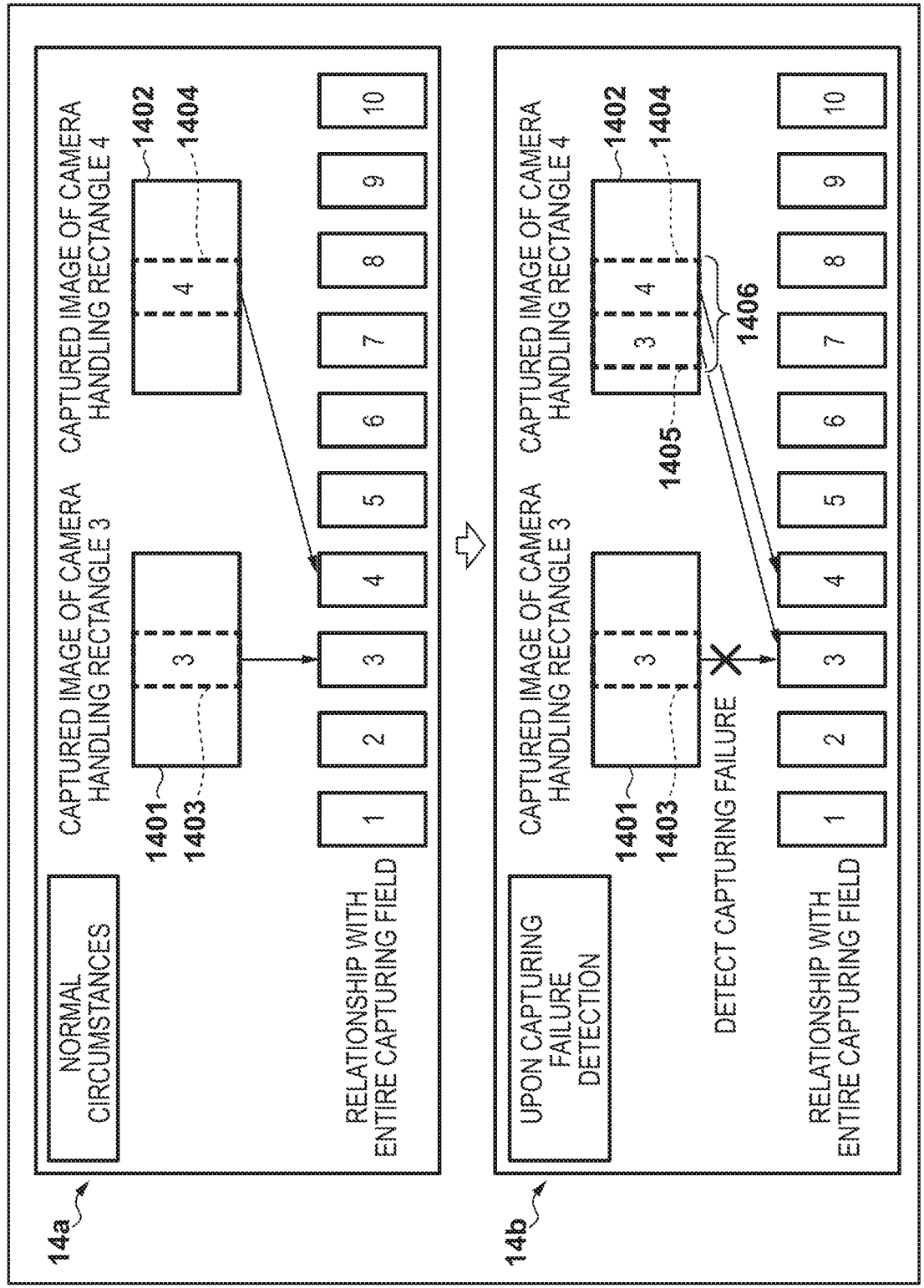
FIG. 14 is a diagram illustrating a change in output images according to an embodiment.

On the other hand, 14*b* in FIG. 14 indicates a case where an error has occurred in the captured image 1401 output from the camera 112 that handles the rectangle 3. When the error detection unit 435 detects the error in the captured image 1401, the sensor system 110 in the next stage (in 14*b* of FIG. 14, the sensor system 110 to which the camera 112 that handles the rectangle 4 belongs) is notified of the error by the camera adapter 120. Having received this notification, the camera adapter 120 (trimming unit 436) of the camera 112 that handles the rectangle 4 cuts out an image of a region 1406, obtained by adding the region 1404 corresponding to the rectangle 4 to a region 1405 corresponding to the rectangle 3, as the rectangular image. The camera adapter 120 that handles the rectangle 4 does not transmit the rectangular image of the region 1403 in which the error has been detected, and instead transmits the rectangular image including the region 1406 containing the region 1404 and the region 1405 of the captured image 1402, i.e., including the regions of the rectangle 3 and the rectangle 4, as replacement data. In this case, the region that is cut out as a rectangular image is changed, and it is therefore necessary to notify the back-end server 270 of the change in the trimming region. Accordingly, post-change region range information is added to a metadata region of the rectangular image for the region 1406. It is assumed that the region range information of the metadata region is added to each frame. The back-end server 270 can also handle cases where an error has occurred by carrying out the synthesis on the basis of the region range information of each frame. The back-end server 270 generates a wide-angle image using the replacement rectangular image in accordance with notification information included in the metadata of the rectangular image.

When the error detection unit 435 has detected an error in an image captured by the camera 112, the back-end server 270 (the image generation unit) may be notified of the detected error over the network. The specific details of the error notification are the frame time (or frame number) at which the error occurred, the sensor system 110 that instructed the output image to be changed, and the details of that change. The back-end server 270 generates a wide-angle image using the replacement rectangular image in accordance with notification information included in the metadata of the rectangular image. This makes it possible for the sensor system 110 to skip adding the region range information to the metadata region.

Figure 15:
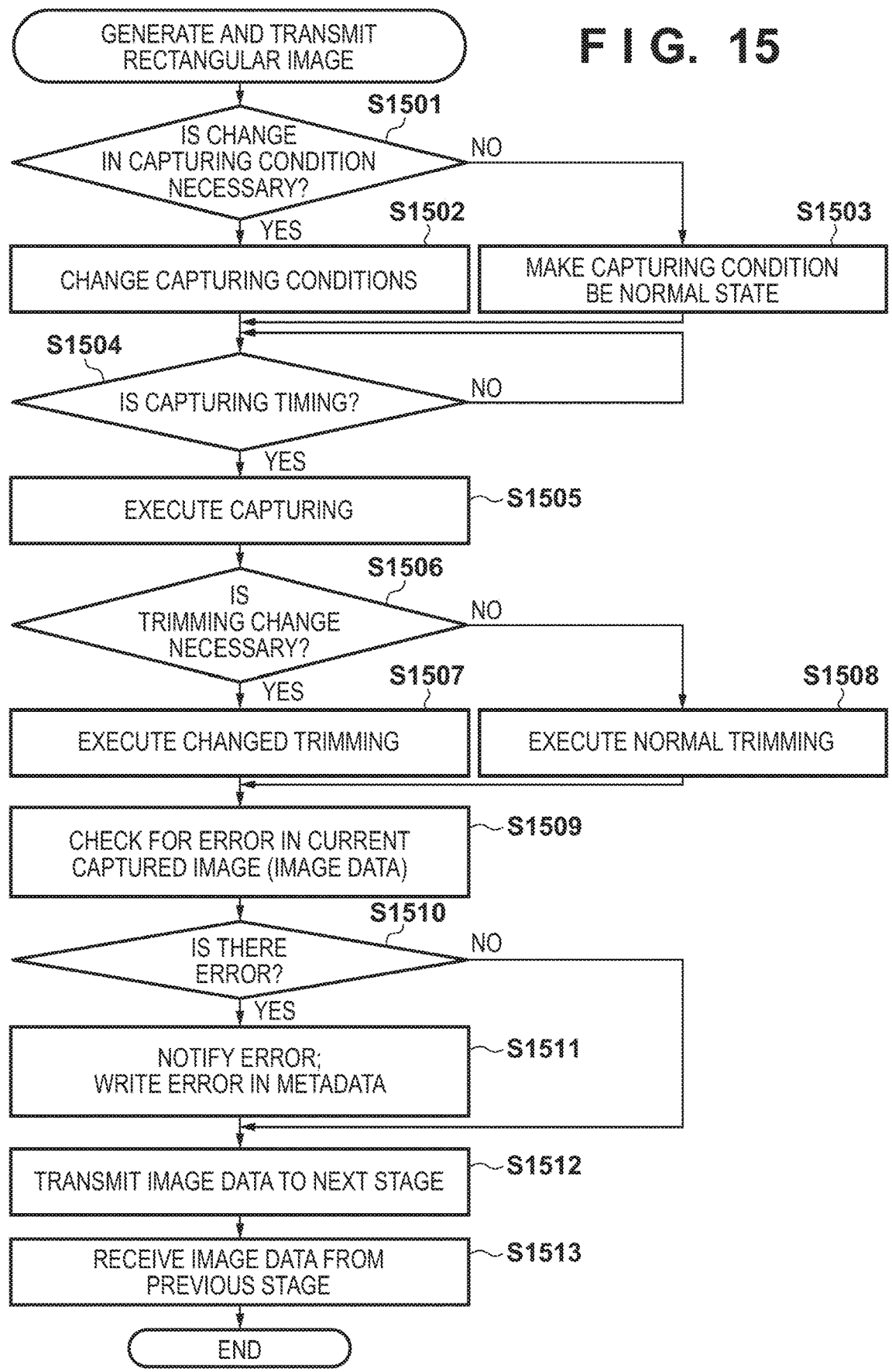
FIG. 15 is a flowchart illustrating a wide-angle image generation process according to an embodiment.

A process by which the camera adapter 120 transmits the rectangular image as described above will be described next with reference to the flowchart in FIG. 15. First, the camera adapter 120 determines whether or not it is necessary to change the capturing conditions by determining whether or not information indicating the presence of an error is included in the metadata of the image data received from the previous stage (S1501). For example, it is necessary to change the capturing conditions of the camera 112, such as the angle of view and/or the capturing direction, in a situation such as where the region of the rectangular image from the previous stage is not present in the captured image obtained under normal capturing conditions. If it is determined that it is necessary to change the capturing conditions (YES in S1501), the camera control unit 441, the camera platform control unit 443, and the like, for example, change the capturing conditions of the camera 112 (S1502). However, if it is not necessary to change the capturing conditions (NO in S1501), the capturing conditions are returned to a normal state (S1503).

The camera adapter 120 determines whether or not it is time to capture by standing by for a synchronization signal from the front-end server 230 (S1504). If it is determined that it is time to capture (YES in S1504), the camera control unit 441 causes the camera 112 to execute capturing, and obtains a captured image (S1505).

The trimming unit 436 determines whether or not it is necessary to change the trimming range by determining whether or not information indicating the presence of an error is included in the image data received from the previous stage (S1506). If it is determined that it is necessary to change the trimming range (YES in S1506), the trimming unit 436 changes the trimming range so that a rectangular image including the region of the rectangular image from the previous stage is cut out from the captured image obtained in S1505, and then carries out the trimming (S1507). In other words, the trimming unit 436 trims the captured image obtained in S1505 so as to include the region of the rectangular image it handles itself, and the region of the rectangular image that should be obtained from the sensor system 110 in the previous stage. On the other hand, if it is determined that it is not necessary to change the trimming range (NO in S1506), the trimming unit 436 carries out normal trimming and cuts out the rectangular image. In other words, the trimming unit 436 trims the captured image obtained in S1505 so as to obtain its own rectangular image.

Next, the error detection unit 435 checks whether or not the captured image obtained S1505 (or the rectangular image cut out in S1507 or S1508) is a captured image in which an error is present (S1509). If the error detection unit 435 determines that the captured image as an error (YES in S1510), the error detection unit 435 notifies the image/audio transmission processing unit 424 to that effect (S1511). The image/audio transmission processing unit 424 writes information indicating presence of the error into the metadata of the image data of the rectangular image cut out in S1507 or S1508.

The camera adapter 120 transmits the rectangular image and metadata obtained as described above, along with the image data obtained by the upstream sensor systems and transmitted to that camera adapter 120, to the sensor system 110 in the next stage (S1512). The camera adapter 120 also receives the image data from the previous stage (S1513). The metadata of the image data received here is used in the above-described determinations of S1501 and S1506. In the transmission of the image data in S1512, each camera adapter 120 transmits the image data generated itself along with the image data received from the sensor system 110 in the previous stage. Accordingly, the sensor system 110z in the final stage transmits the image data generated by the sensor systems 110a to 110y and the image data generated itself to the front-end server 230. The front-end server 230 stores the transmitted image data in the database 250. The front-end server 230 generates a wide-angle image using the image data needed to generate the wide-angle image, which is stored in the database 250.

The process of transmitting the rectangular image described above will be described more using FIG. 16A. Rectangular images 1601, 1602, 1603, and 1604, which are pieces of image data, are the rectangular images of a rectangle 1, a rectangle 2, a rectangle 3, and a rectangle 4, respectively, at a capturing time t. Assume that an error has been detected in the rectangular image 1602 by the error detection unit 435. The error detection unit 435 may notify the sensor system 110 in the next stage of the detected error in the rectangular image 1602, or may record the error as metadata of the rectangular image 1602.

Figure 16A:
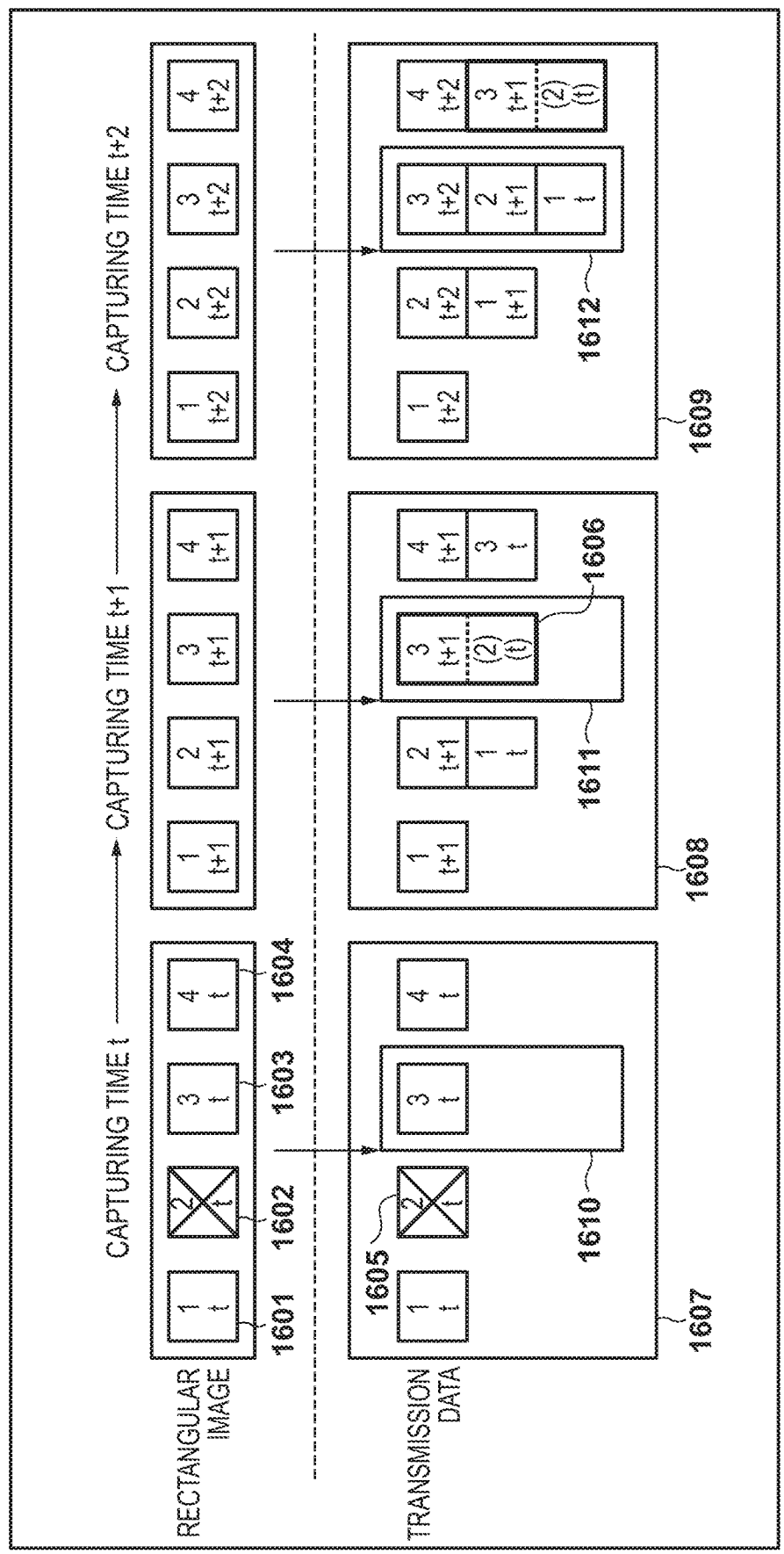
FIG. 16A is a diagram illustrating an overview of a transmission process according to an embodiment.

The lower part of FIG. 16A indicates transmission data groups 1607, 1608, and 1609, which are transmitted from respective sensor systems 110. Each piece of transmission data includes the rectangular image generated itself, as well as the rectangular image generated by the sensor system 110 in the previous stage. Of the transmission data group 1607 at the capturing time t, transmission data 1605 including the rectangular image 1602 generated from the captured image containing an error is transmitted to the sensor system 110 handling the adjacent rectangle 3. The rectangle 3 at the capturing time t is included in transmission data 1610, and is transmitted to the sensor system 110 handling the rectangle 4.

Next, at capturing time t+1, the sensor system 110 handling the rectangle 3 recognizes that an error is present in the captured image of the rectangle 2 from the previous time (the capturing time t). Accordingly, the sensor system 110 handling the rectangle 3 changes the trimming region (and the capturing conditions, as necessary), generates a rectangular image 1606 of the rectangle 3 (capturing time t+1) including the region of the rectangle 2, and transmits that image to the sensor system 110 handling the adjacent rectangle 4 as transmission data 1611. The rectangular image 1606 is image data including replacement data that replaces the rectangle 2 from the capturing time t. The rectangle 2 is obtained normally at the capturing time t+1, and thus transmission data 1612 from the capturing time t+2 is normal transmission data that does not include replacement data.

Note that for descriptive purposes, FIG. 16A does not illustrate all of the data that is transmitted. For example, data transmitted before the capturing time t is also present in the transmission data group 1607 from the capturing time t and the transmission data group 1608 from the capturing time t+1, but this data need not be described and is therefore not illustrated in order to avoid complicating the diagram.

The configuration described above is useful in a case where a plurality of sensor systems 110 including cameras 112 are present, are linked together (daisy-chained), and send captured data to adjacent sensor systems 110. Having detected an error, the error detection unit 435 notifies the adjacent sensor system 110 that is the destination of the image data, and the adjacent sensor system 110 responds thereto. This processing makes it possible to replace image data having an error with replacement data before that image data reaches the front-end server 230.

Although the second embodiment describes a configuration in which a plurality of sensor systems 110 are daisy-chained, the configuration is not limited thereto. For example, the configuration may be such that the sensor systems 110 are connected to the switching hub 180 in a star type connection. Even with a star type connection, cameras 112 adjacent to each of the other cameras 112 can be set and defined as a logical structure for communication partners, for example, and thus the present embodiment can be applied.

Additionally, the second embodiment describes changing the trimming region when an error is detected in the image data (the rectangular image) from the previous stage and cutting out a region, corresponding to two consecutive rectangles, as a single rectangle, as indicated by 14b in FIG. 14. However, the configuration is not limited thereto. For example, in 14b of FIG. 14, a rectangular image corresponding to the region of the rectangle 3 from the captured image 1402 and a rectangular image corresponding to the region of the rectangle 4 may be cut out individually. In this case, at the capturing time t+1, the transmission data 1611, which includes the rectangular image of the rectangle 3 and replacement data 1620 separate from the rectangle 3, is transmitted, as illustrated in FIG. 16B. The replacement data 1620 is a rectangular image obtained by the trimming unit 436 trimming an image corresponding to the region of the rectangle 2 from the captured image obtained at the capturing time t+1, and is used as data for replacing the rectangle 2 from the capturing time t.

Although the second embodiment describes a case where an error is present in the image captured by a single camera 112, a case where errors arise simultaneously in the captured images from a plurality of cameras 112 can clearly be handled in the same manner. If errors are present in the image data from a consecutive plurality of cameras 112, the regions cut out through the trimming may be expanded so as to include the regions of the image data in which those errors have been detected.

According to the second embodiment as described thus far, in a configuration that generates a wide-angle image by cutting out images and combining the images after transmission, a wide-angle image can be generated even if an error arises in the images captured by some of the plurality of cameras.

Additionally, a situation where the image generation unit of the back-end server 270 is notified of details detected by the error detection unit 435, and the image generation unit handles a response to that notification, can be handled as well. Handling such a situation in this manner makes it unnecessary to provide a process of embedding in the metadata of the rectangular image transmitted by the camera adapter 120.

Third Embodiment

In the second embodiment, the error detection unit 435 notifies the sensor system 110 the next stage of an error in the captured image, and the image data in which the error has arisen is compensated for by the sensor system 110 in the next stage changing the trimming region. In a third embodiment, the image data in which the error has arisen is compensated for in a distributed manner by the error detection unit 435 that has detected an error in the image data notifying two or more sensor systems 110 of the error, and the two or more sensor systems 110 changing the trimming regions.

The configuration according to the third embodiment is similar to the configuration according to the second embodiment (FIGS. 1 and 10). In the third embodiment, the processing by the camera adapter 120 that has received a notification from the error detection unit 435 (the way in which the trimming region is changed) differs from that in the second embodiment. Processing performed in the third embodiment will be described next with reference to FIG. 17. Although FIG. 17 illustrates five sensor systems 110 for the sake of simplicity, it goes without saying that the number is not limited thereto.

Figure 17:
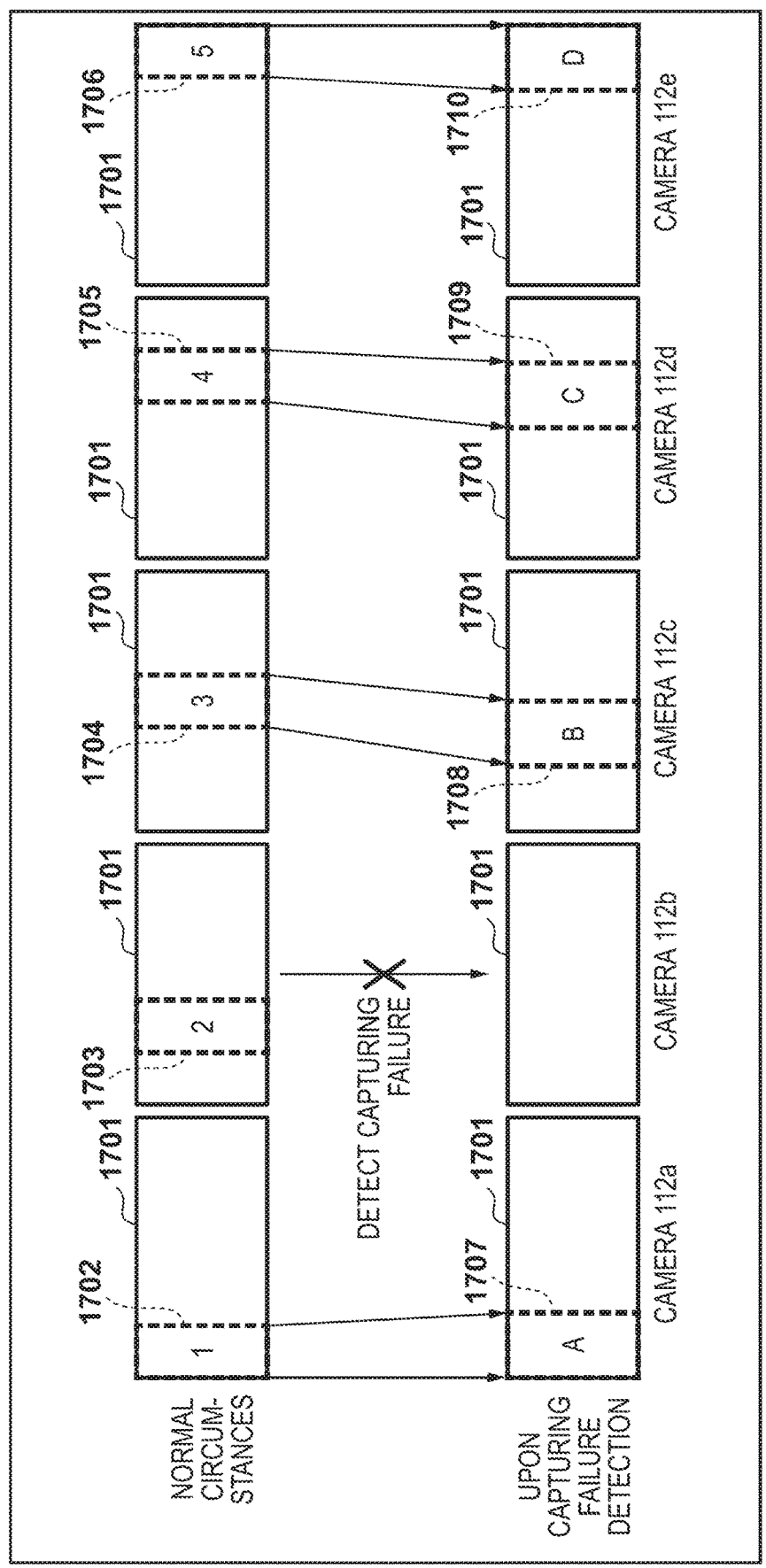
FIG. 17 is a diagram illustrating a change in output images according to an embodiment.

In FIG. 17, a region 1701 represents the overall view field of a wide-angle image. A region 1702 within the region 1701, which represents the wide-angle image, is assumed to be a region handled by the sensor system 110a for the rectangle 1, for example. Under normal circumstances, when an error is not arisen in the captured image, the sensor system 110a for the rectangle 1 handles the region 1702. Likewise, the sensor system 110b for the rectangle 2 handles a region 1703, the sensor system 110c for the rectangle 3 handles a region 1704, the sensor system 110d for the rectangle 4 handles a region 1705, and the sensor system 110e for a rectangle 5 handles a region 1706.

Assumed here that an error has arisen in the captured image in the sensor system 110b for the rectangle 2. In this case, the error detection unit 435b of the sensor system 110b instructs the sensor systems 110a, 110c, 110d, and 110e, which handle the rectangles 1, 3, 4, and 5, respectively, to change the trimming positions (error occurrence) for the purpose of changing the view fields handled by those systems. Although the five cameras 112 are assigned to equal regions for the overall wide-angle image under normal circumstances, the trimming positions are changed when an error has arisen in the captured image so that the captured images from the other four cameras 112, which do not contain errors, are assigned to the regions for the overall wide-angle image. In FIG. 17, the sensor system 110a changes the region of the rectangular image from the region 1702 to a region 1707. Likewise, the sensor systems 110c to 110e change the regions of the respective rectangular images from the region 1704 to a region 1708, from the region 1705 to a region 1709, and from the region 1706 to a region 1710.

In the second embodiment, when an error has arisen in a captured image or a rectangular image, the size of the rectangular image output from the sensor system 110 handling the rectangle 3 is greater than the sizes from the other sensor systems 110. As such, it is necessary for the back-end server 270, which generates the wide-angle image, to handle the rectangular image including the regions 1404 and 1405 indicated by 14b in FIG. 14 in a manner different from the other rectangular images. However, according to the third embodiment, the sizes of the rectangular images can be changed equally, which lightens the load for generating the wide-angle image as compared to the second embodiment. The third embodiment is particularly useful when an error state continues for a relatively long amount of time in a single camera.

In the third embodiment, when an error has arisen in a captured image or a rectangular image, the error detection unit 435 that has detected the error notifies a plurality of the sensor systems 110 that at least the trimming region should be changed. The notification of the error may be made over the daisy chain, or may be implemented through another method. For example, the image computing server 200 may be notified by the error detection unit 435, and the sensor systems 110 that are required to change their trimming regions may then be notified by the image computing server 200. A sensor system 110 that has been instructed to change its trimming region finds the necessary trimming region from the position, size, and so on of the view field (the region 1701), in the wide-angle image, of the rectangular image cut out by the sensor system that made the instruction. The information necessary for finding the trimming region may be held in each sensor unit in advance, may be communicated from the sensor system that makes the notification of the error, or may be communicated from the image computing server 200.

According to the third embodiment, all the cameras 112 have the same-sized rectangular regions, and it is therefore no longer necessary for the image generation unit (the back-end server 270) to carry out special processing for specific rectangular region. Although FIG. 17 illustrates changing the trimming for the images captured by all of the cameras aside from the camera handling the rectangle 2 (the cameras 112a and 112c to 112e) for the purpose of covering the region of the rectangle 2, the configuration is not limited thereto. For example, the region of the rectangle 2 may be covered by changing the trimming for the images captured by the cameras 112a and 112c, which are adjacent to the camera 112b.

Fourth Embodiment

Figure 18:
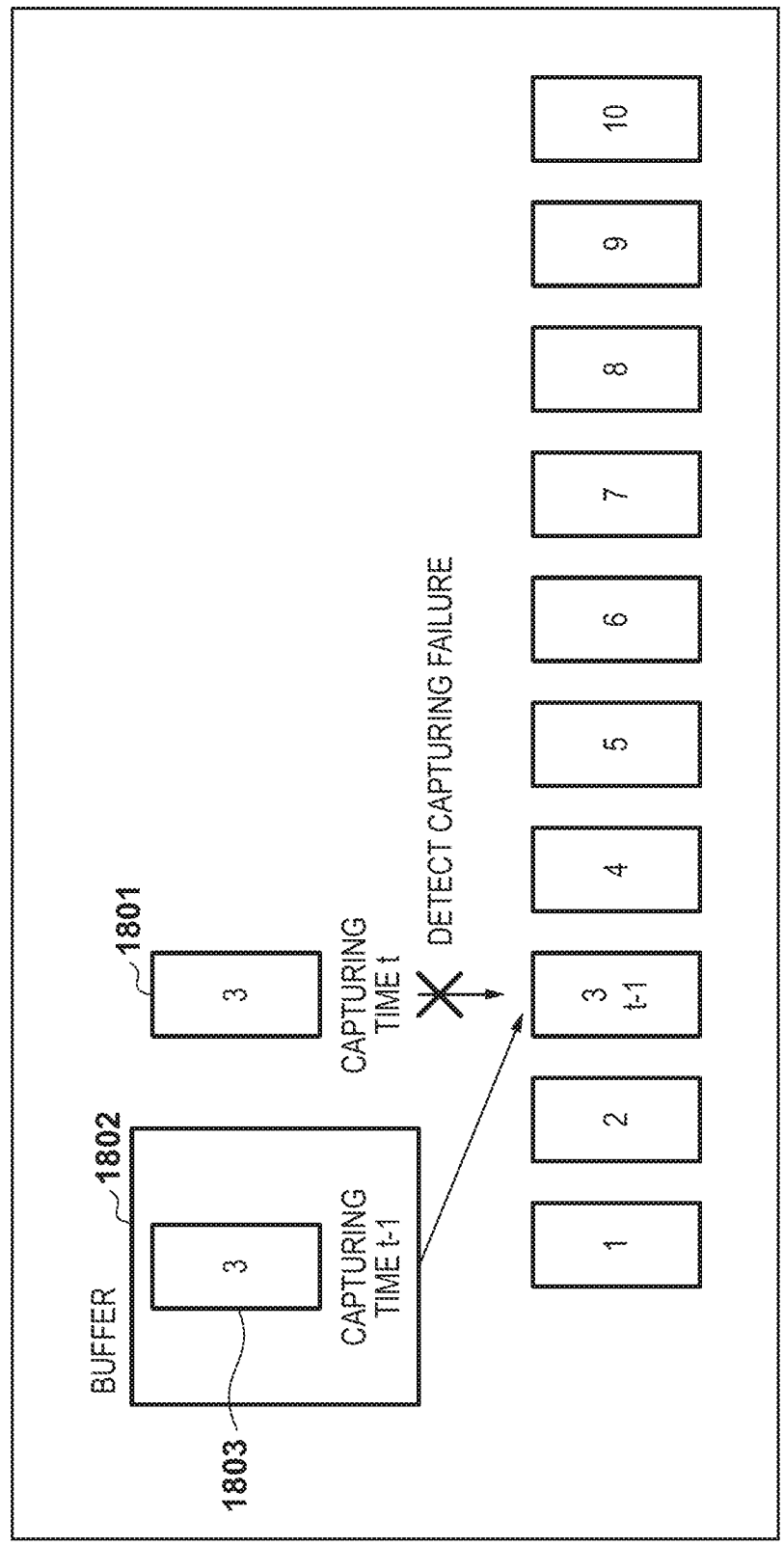
FIG. 18 is a diagram illustrating an overview of processing according to an embodiment.

In the second embodiment and the third embodiment, when an error is detected in the image captured by a given camera, the rectangular image that should be obtained from the camera is compensated for by an image obtained by changing the trimming region, using correct captured images obtained from other cameras. In a fourth embodiment, the sensor systems 110 are provided with buffers, which hold captured images that have been obtained successfully in preparation for a failure to obtain a captured image. A rectangular image in which an error has been detected is compensated for using the captured images held in the buffers. The configurations of the image processing system 100 and the camera adapters 120 in the fourth embodiment are the same as in the second embodiment (FIGS. 1 and 10). Operations carried out in the fourth embodiment will be described next with reference to FIG. 18. Note that FIG. 18 illustrates a case where there are ten sensor systems 110 as an example.

Processing carried out in the fourth embodiment when an error has arisen in a captured image will be described using FIG. 18. In the fourth embodiment, the sensor system 110 includes a buffer 1802 as a temporary storage region for image data. The captured image captured at a capturing time t−1, which is a capturing timing one previous to the capturing time tin the synchronized capturing, is always held in the buffer 1802. FIG. 18 assumes that the error detection unit 435 has detected an error in the image captured by the camera 112 that handles the rectangle 3. In this case, the camera adapter 120 generates a rectangular image, as a replacement for a captured image 1801 from the capturing time t when capturing failed, by trimming a captured image 1803 from the capturing time t−1 held in the buffer 1802, and outputs that image data. Although the foregoing describes the captured images is being held in the buffer 1802, the configuration is not limited thereto. A rectangular image obtained by trimming the captured image from the capturing time t−1 may be held in the buffer 1802, and the rectangular image held in the buffer 1802 may then be transmitted when an error is detected in the captured image from the capturing time t. Additionally, captured images or rectangular images from situations where the error detection unit 435 has not detected an error may be held in the buffer 1802.

Although the foregoing describes a configuration in which the buffer 1802 is provided for each of the sensor systems 110 (for each of the cameras 112), the configuration may be such that the buffer 1802 is provided in the database 250. In this case, in the sensor system 110 that handles the rectangle 3, the camera adapter 120 sets a flag indicating a capturing error in the metadata added to the rectangular image transmitted to the next stage. Because the database 250 usually stores images for the purpose of generating an image, it is not particularly necessary to provide an additional storage region. If a flag indicating a capturing error is set in the metadata of the rectangular image from the capturing time t (the rectangular image obtained from the captured image 1801), the front-end server 230 stores the rectangular image from the past time t−1, within the buffer 1802, in the database 250 as replacement data for the capturing time t.

If a camera 112 has malfunctioned and cannot output image data to a later stage, the situation cannot be handled by metadata added to the image data. In this case, the error detection unit 435 directly notifies the front-end server 230 of an error, and having received the notification, the front-end server makes an instruction to use the image data from the past time t−1 (the captured image 1803) as replacement data for the capturing time t. Alternatively, if a rectangular image that should be transmitted to a later stage cannot be obtained, the camera adapter 120 may cause error information, indicating that an error has arisen, to be transmitted to the later stage.

According to the fourth embodiment as described thus far, a wide-angle image can be generated without providing the sensor systems, the image generation unit, or the like with a special function for changing the trimming range. Because the replacement data corresponds to the captured image from the capturing time t−1, the capturing time is shifted from the capturing times of the other rectangular images. However, the background image, which occupies the majority of the image data, changes little over time, and thus there is little influence even if rectangular images which have times that differ to the minimum extent possible are used. When only some of the rectangular images are image data from the past time t−1, there are cases where that image data cannot be matched with the rectangular images (image data) from other times t. In this case, the rectangular images from the time t−1 may be used for the other rectangular images as well.

Fifth Embodiment

The configurations of the image processing system 100 and the camera adapters 120 in a fifth embodiment are the same as in the second embodiment (FIGS. 1 and 10). In the fifth embodiment, when capturing has failed, a rectangular image without error is obtained by executing additional capturing rather than waiting for the normal capturing timing. The fifth embodiment will be described next using FIG. 19. Note that FIG. 19 illustrates a case where there are ten sensor systems 110 (cameras 112) as an example.

Figure 19:
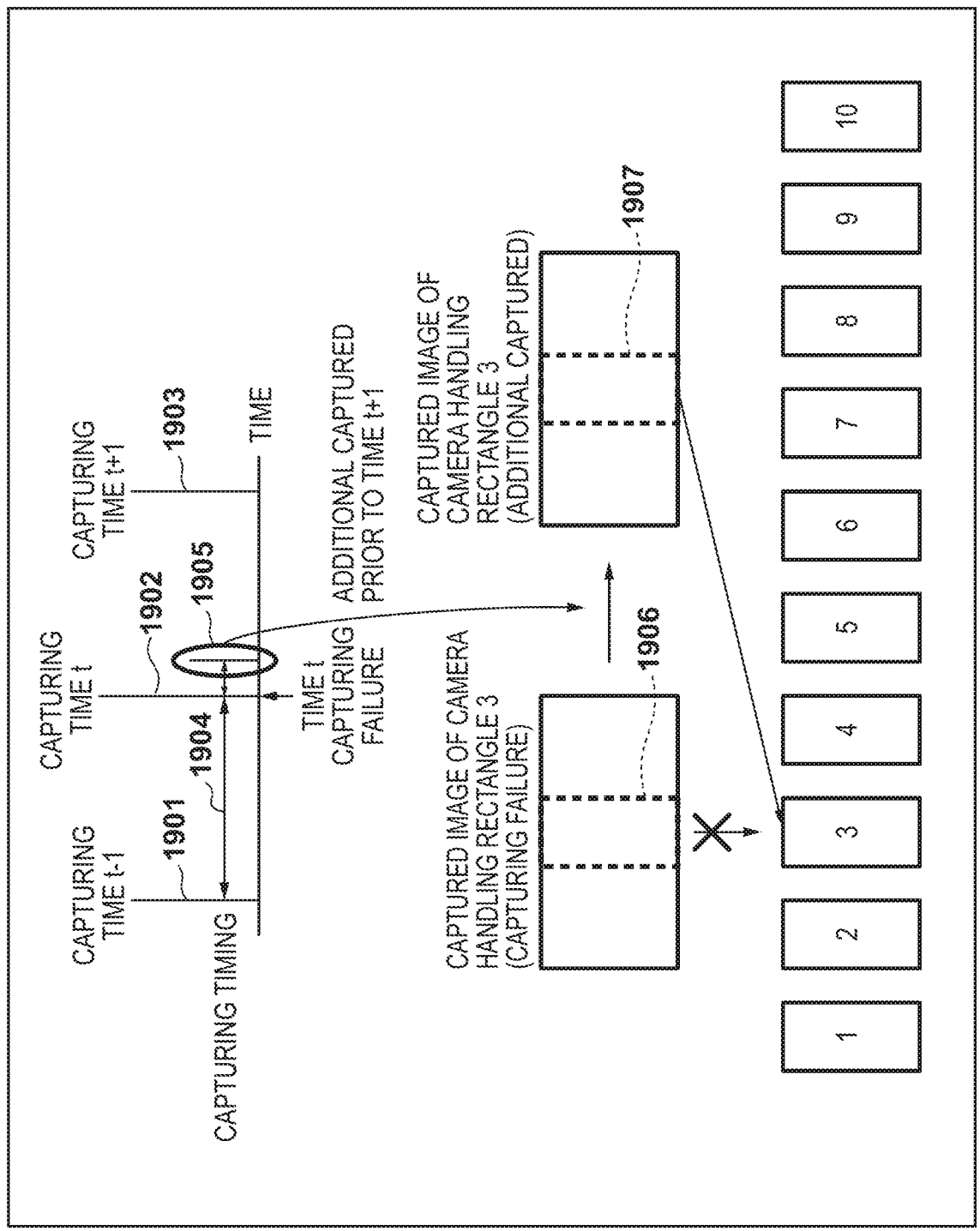
FIG. 19 is a diagram illustrating processing performed by a capturing control unit according to an embodiment.

As illustrated in FIG. 19, the camera 112 executes continuous capturing at the capturing time t−1 (1901), the capturing time t (1902), and the capturing time t+1 (1903), at a constant interval 1904. These capturing times are capturing timings for synchronized capturing. Each capturing time is a time at which all of the cameras are synchronized. Although not illustrated, the continuous capturing is carried out over the constant interval 1904 in the same manner at times before the capturing time t−1 and times after the capturing time t+1. Here, it is assumed that capturing has failed at the capturing time t (1902), an error has arisen in the image data, and the error has been detected. In this case, in the fifth embodiment, additional capturing is executed without waiting for the next capturing time t+1 (1903). In FIG. 19, the additional capturing is executed at time 1905.

When the error detection unit 435 detects an error in the image captured by the camera 112 at time 1902, the error detection unit 435 instructs the camera control unit 441 to execute additional capturing. Having received the instruction to execute additional capturing, the camera control unit 441 executes the additional capturing at the earliest timing possible after receiving the instruction.

The case where the capturing fails at the capturing time t (1902) but succeeds when the capturing is executed again at the capturing time 1905 corresponds to a case where the cause of the capturing failure has been eliminated in an extremely short amount of time. A case where some kind of obstruction appears before the image capturing device for a short amount of time, but moves away quickly, is conceivable, for example. Note that if the capturing fails during the additional capturing executed at the capturing time 1905 as well, additional capturing is executed again before the capturing carried out at the capturing time t+1.

According to the fifth embodiment, if the region 1906 of the captured image (the rectangle 3) cannot be used, additional capturing is executed, and the region 1907 of the correct captured image that has been obtained can be used as replacement image data. The time of the additional capturing is a time earlier than the time t+1 (1903), which is the normal capturing time, and there is thus little difference from the capturing time t. Accordingly, the captured image obtained from the additional capturing has less image difference caused by a shift in time than the captured image obtained at the capturing time t+1. Note that in the case where the amount of time from when the capturing failure is detected to when the additional capturing is executed exceeds the capturing interval 1904, the additional capturing is not executed, and instead, capturing is executed at the time t+1 (1903), which is the next capturing time.

The capturing time is typically recorded in the metadata added to the image data. In the present embodiment too, when the back-end server 270 combines the rectangular images, the capturing time metadata is referred to in order to collect and use a plurality of pieces of image data from the same time. In the present embodiment, image data obtained from additional capturing executed after the capturing time t but before the capturing time t+1 is transmitted as a replacement for the image data obtained from the image captured at the capturing time t. Accordingly, a time that is different from the image data obtained from the other sensor systems 110, in which the capturing did not fail, is recorded in the metadata added to the image data obtained from the additional capturing. In this case, the back-end server 270 combines the image data in which is recorded the time closest to the capturing time t, when the capturing was expected to be executed, with the other image data captured at the capturing time t, and generates the wide-angle image.

Note that when recording the capturing time in the metadata of the image data obtained from the additional capturing, the capturing time t of synchronized capturing in which an error was detected in the captured image may be recorded as the capturing time. For example, in FIG. 19, the capturing time t may be recorded in the rectangular image obtained from the additional capturing executed at time 1905. In this case, the back-end server 270 does not need to carry out special processing for the metadata with respect to the capturing time, and can simply carry out the normal combination processing.

According to the fifth embodiment as described thus far, executing additional capturing rather than waiting for the next capturing timing makes it possible to generate a wide-angle image in which the effect of differences between the capturing times among adjacent rectangular images is reduced.

Sixth Embodiment

In the embodiments described above, the cameras 112 have the same capturing framerates, and the camera adapters 120 have the same transmission framerates. Accordingly, the configurations are such that all of the captured data is basically transferred. In a sixth embodiment, a situation where an error has arisen in a captured image is handled by setting the capturing framerate to be higher than the transmission framerate in advance. The configurations of the image processing system 100 and the camera adapters 120 in the sixth embodiment are the same as in the second embodiment (FIGS. 1 and 10). Operations carried out in the sixth embodiment will be described next with reference to FIG. 20. Note that FIG. 20 illustrates a case where, in the present embodiment, there are ten cameras 112 as an example.

Figure 20:
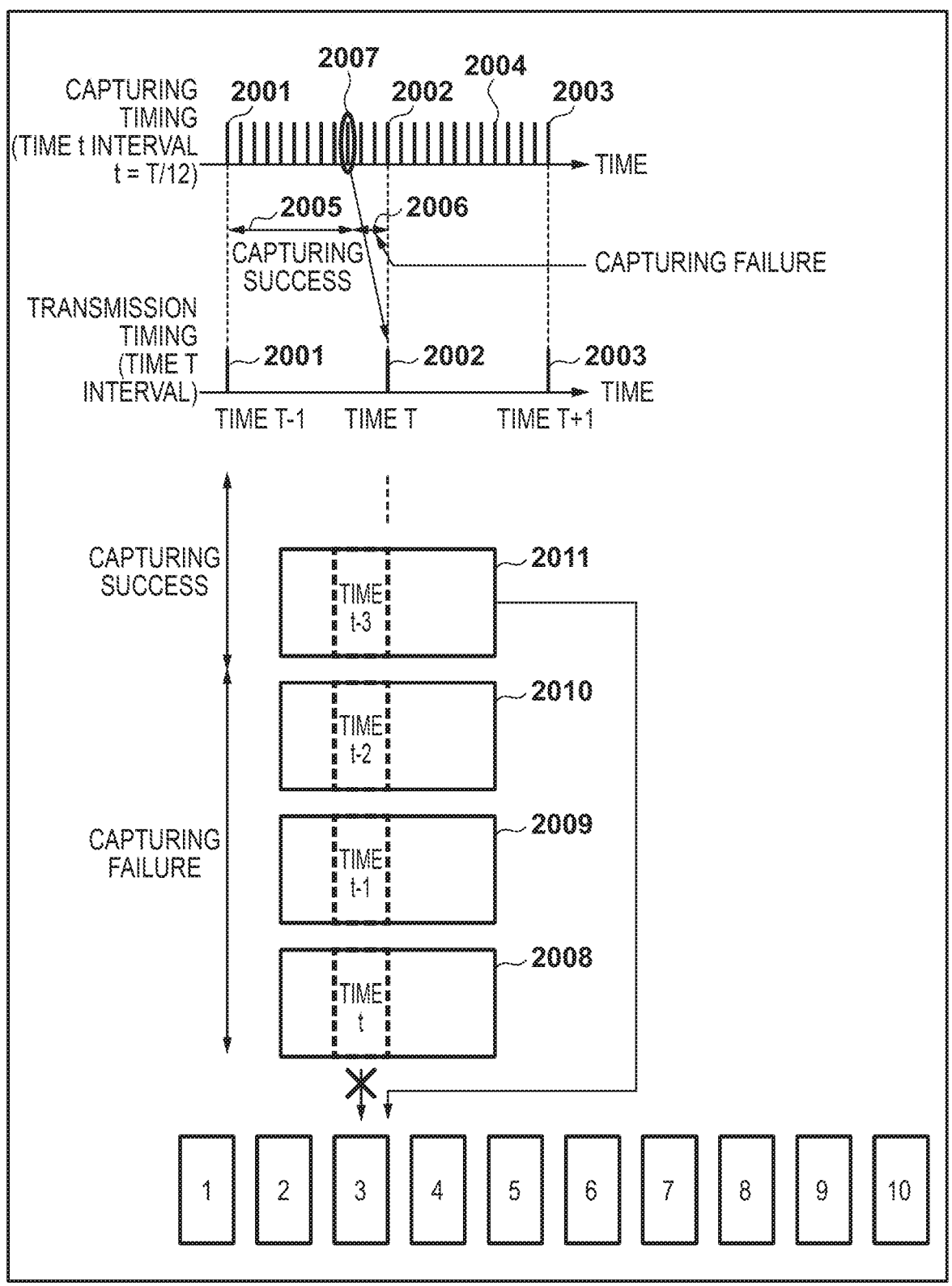
FIG. 20 is a diagram illustrating an overview of processing according to an embodiment.

As illustrated in FIG. 20, the transmission of the rectangular images is carried out at an interval corresponding to a transmission time T (time 2001, time 2002, and time 2003). Relative to this transmission timing, the capturing by the cameras 112 is carried out at an interval corresponding to the capturing time t (which in the present example is an interval $\frac{1}{12}$ the time T). In other words, capturing is executed for 12 times between the transmission time T (2002) and the transmission time T+1 (2003). Although this example describes the capturing time interval as being $\frac{1}{12}$ of the transmission time interval, the interval is not limited thereto. 2004 is an example of the timing of capturing executed by the camera 112. The sensor system 110 also includes a buffer that temporarily stores the image data obtained from the image that has been captured, and the rectangular image stored in the buffer is updated if there is no error in the captured image. At the transmission timing, the newest rectangular image stored in the buffer for temporary storage is transmitted.

For example, in FIG. 20, it is assumed that correct captured images are obtained up until time 2007 (a period 2005), and that an error is detected in the captured image from the next capturing timing after the capturing time 2007 up to the time 2002 (the transmission time T) (a period 2006). If an error has been detected in a captured image, the image data stored in the buffer for temporary storage is not updated. In this case, at the time 2002 of the transmission timing (the transmission time T), the rectangular image obtained at the capturing time t−3 is the newest rectangular image stored in the buffer. At time 2002, the correct captured image that was obtained last, i.e., the rectangular image obtained from the captured image at time 2007, is transmitted. The image data from the capturing time 2007 is the rectangular image obtained from the captured image at the nearest time prior to the time 2002 (the transmission time T).

In FIG. 20, a captured image 2008 from time t, a captured image 2009 from time t−1, and a captured image 2010 from time t−2 are captured image from when capturing has failed. The rectangular image obtained from the captured image 2011 from time t−3 is stored in the buffer, and a rectangular image cut out from the captured image 2011 is transmitted at the transmission time T.

With respect to the capturing time information in the metadata added to the captured data in the sixth embodiment, a capturing time different from the time of the transmission timing is added, in the same manner as in the fifth embodiment. Also like the fifth embodiment, the time T, which corresponds to the transmission time, may be added to the replacement data as-is, regardless of the actual capturing time.

By carrying out the operations according to the sixth embodiment, and capturing at a higher framerate than the transmission framerate in advance, the replacement data closest to the capturing time at which the capturing failed can be obtained without executing additional capturing.

Seventh Embodiment

In the second embodiment, when an error is detected in an image captured by the camera 112 in a given sensor system 110 (a first camera), replacement data is generated from an image captured by the camera 112 in the sensor system 110 in the next stage (a second camera). Accordingly, when a captured image in which an error has been detected is obtained from the first camera, the replacement data is generated from a captured image obtained from the second camera, which is arranged at a different position and attitude from the first camera. In the seventh embodiment, the positional relationship between the first camera and the second camera is taken into account when generating replacement data for the first camera using a captured image obtained from the second camera. The configurations of the image processing system 100 and the camera adapters 120 in the seventh embodiment are the same as in the second embodiment (FIGS. 1 and 10). In the seventh embodiment, the rectangular image corresponding to the second camera and the replacement data for the rectangular image corresponding to the first camera are obtained separately, as described with reference to FIG. 16B.

Figure 21:
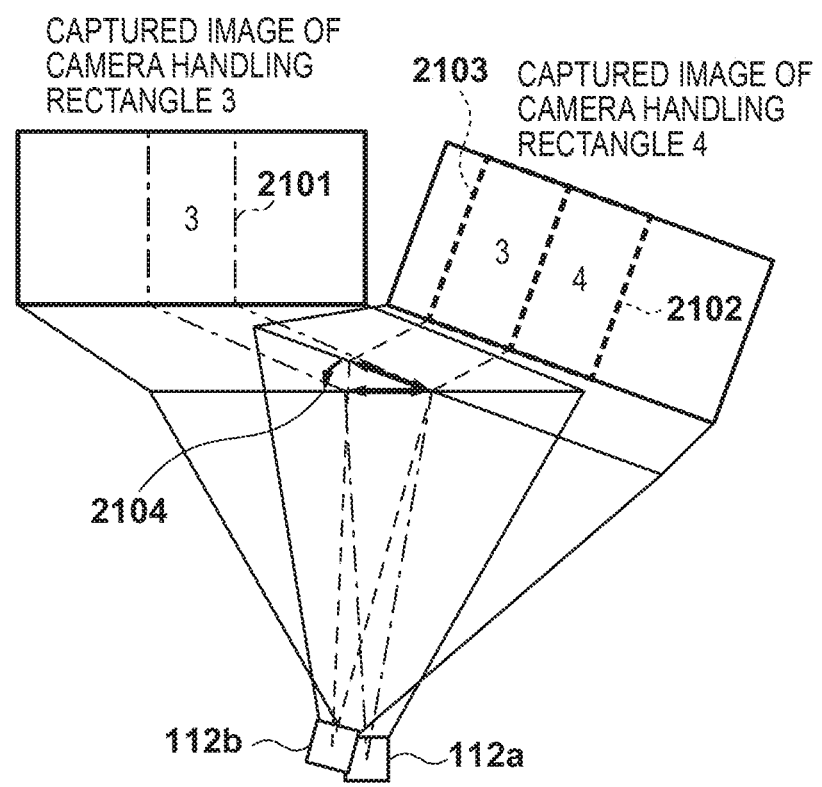
FIG. 21 is a diagram illustrating processing according to an embodiment.

A trimming process carried out by the camera adapter 120 according to the seventh embodiment will be described next with reference to FIG. 21. Like the processing described in the second embodiment, it is assumed that an error has arisen in the rectangular image corresponding to the rectangle 3 (the image data in a region 2101). The sensor system 110 that handles the rectangle 4 adds a rectangular image (a region 2103) in addition to the rectangular image of the rectangle 4 (a region 2102), and takes the image of the region 2103 as the replacement data for the region 2101 of the rectangle 3. Thus far, this is the same as in the second embodiment.

In the seventh embodiment, the image data of the region 2103 is subjected to additional processing that takes into account a difference between the arrangement of the camera 112*a*, which handles the rectangle 3, and the camera 112*b*, which handles the rectangle 4. Specifically, although there is overlap between the field of view regions captured by the camera 112a, which handles the rectangle 3, and the camera 112b, which handles the rectangle 4, a difference arises in the image data between the region 2101 and the region 2103 due to differences in the positions, attitudes, and so on of the cameras.

Accordingly, in the present embodiment, parameters pertaining to the positions, attitudes, and so on of the cameras are shared among the sensor systems 110 in advance. Then, when the trimming range is changed for the replacement data of another sensor system 110, the replacement data is subjected to a geometric correction process on the basis of differences in the capturing positions of the cameras. In FIG. 21, the data in the region 2103 is subjected to a geometric correction process so that that data conforms to the data captured by the camera 112a, which handles the rectangle 3, by an amount equivalent to the difference in the position and attitude (conceptually indicated as an angle 2104 in FIG. 21). The angle 2104 corresponds to a difference between the position and attitude of the camera 112b, which handles the rectangle 4, relative to the region 2103, and the position and attitude of the camera 112a, which handles the rectangle 3, relative to the region 2101. The difference between the positions and attitudes is caused by a difference between the physical arrangement locations of the cameras 112a and 112b.

As the geometric correction process, homography (a projection transformation matrix) based on the capturing plane of another camera is found from the position and attitude parameters of the camera that are known in advance, and the data of the replacement data region is subjected to a matrix computation. This correction process makes it possible to obtain replacement data that appears to have been captured by the camera 112a, which handles the rectangle 3. Carrying out this correction process improves the accuracy of the generated image when the back-end server 270 generates the wide-angle image. Note that the above-described correction process can also be applied to the rectangular image 1606 obtained in FIG. 16A. In this case, the above-described correction process may be applied to the part of the rectangular image 1606 corresponding to the region of the rectangle 2 (the region 1405 and 14b of FIG. 14).

In the above-described second to seventh embodiments, the error detection unit 435 is provided in each of the sensor systems 110, i.e., for each of the cameras 112, but the configuration is not limited thereto. A single error detection unit 435 may detect the presence of errors in captured images or rectangular images for a plurality of the sensor systems 110. In this case, the single error detection unit 435 notifies the sensor system 110 that has obtained a captured image in which an error is detected, of the presence of the error in the captured image or the rectangular image. Additionally, in the third embodiment in particular, the configuration may be such that a single error detection unit 435 notifies two or more sensor units when it is necessary to change the trimming for those sensor units.

Although the foregoing has described embodiments of the present invention in detail, the present invention is not intended to be limited to the above-described embodiments, and many variations and changes can be made without departing from the scope of the present invention as set forth in the scope of patent claims. For example, the first to seventh embodiments describe compensating for a situation where images from some cameras cannot be used in a configuration where a plurality of images used to generate a combined image are obtained from a plurality of images captured by a plurality of cameras. Accordingly, the first embodiment describes generating a desired viewpoint image as an example, and the second to seventh embodiments describe generating a wide-angle image as an example. However, it is clear that the configuration of the first embodiment can be applied to the generation of a wide-angle image, and that the configuration of the second to seventh embodiments can be applied in the generation of a desired viewpoint image.

According to one aspect of the present invention, the likelihood that an appropriate image will not be generated from images captured by a plurality of cameras can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing system comprising:
a plurality of image processing apparatuses including an image processing apparatus that
(i) transmits, to a first another image processing apparatus among the plurality of image processing apparatuses, an image that is derived from at least one of a plurality of image capturing apparatuses and is used for generating a virtual viewpoint image,
(ii) receives an image transmitted from a second another image processing apparatus among the plurality of image processing apparatuses different from the first another image processing apparatus,
(iii) transmits, in a case where an image to be received from the second another image processing apparatus is received, the received image to the first another image processing apparatus, and (iv) transmits, in a case where an image to be received from the second another image processing apparatus is not received, an alternate image to the first another image processing apparatus, the alternate image being an image used for the virtual viewpoint image; and a generating apparatus that generates the virtual viewpoint image based on a plurality of images transmitted by the plurality of image processing apparatuses.

2. The image processing system according to claim 1, wherein the plurality of image capturing apparatuses are connected to the plurality of image processing apparatuses;

the image processing apparatus generates an image for transmitting to the first another image processing apparatus based on a captured image obtained from a connected image capturing apparatus among the plurality of image capturing apparatuses; and in the case where an image to be received from the second another image processing apparatus is not received, the image processing apparatus generates the alternate image for transmitting to the first another image processing apparatus.

3. The image processing system according to claim 1, wherein in a case where an image to be received from the second another image processing apparatus is not received before a predetermined amount of time passes, the image processing apparatus transmits the alternate image to the first another image processing apparatus.

4. The image processing system according to claim 1, wherein the plurality of image processing apparatuses are daisy-chained.

5. The image processing system according to claim 1, wherein in a case where a background image, which does not include a region corresponding to a specified object, to be received from the second another image processing apparatus is not received, the image processing apparatus transmits an alternate background image to the first another image processing apparatus.

6. The image processing system according to claim 1, wherein:

the image processing apparatus generates an image used for generating the virtual viewpoint image by extracting a partial image from a captured image obtained from the connected image capturing apparatus; and in the case where an image to be received from the second another image processing apparatus is not received, the image processing apparatus generates the alternate image by changing an extraction range of the partial image extracted from the captured image.

7. The image processing system according to claim 6, wherein the image processing apparatus changes a capturing condition of the connected image capturing apparatus so that a region including at least part of a region corresponding to the partial image to be received from the second another image processing apparatus is able to be extracted from the captured image obtained by the connected image capturing apparatus.

8. The image processing system according to claim 7, wherein the capturing condition includes an angle of view and/or a capturing direction of an image capturing apparatus.

9. The image processing system according to claim 6, wherein the image processing apparatus changes the extraction range so that a region corresponding to the extracted partial image includes at least part of a region corresponding to the partial image to be received from the second another image capturing apparatus.

10. The image processing system according to claim 6, wherein the image processing apparatus changes the extraction range so that a region corresponding to a partial image for transmitting to the first another image processing apparatus and a region corresponding to a partial image to be received from the second another image processing apparatus are extracted individually from a captured image obtained from the connected image capturing apparatus.

11. The image processing system according to claim 10, wherein a partial image including a extracted region corresponding to the partial image to be received from the second another image processing apparatus is transformed based on capturing conditions of the connected image capturing apparatus and an image capturing apparatus connected to the second another image processing apparatus, and is transmitted to the first another image processing apparatus.

12. A method of controlling an image processing system comprising: a plurality of image processing apparatuses including an image processing apparatus, a first another image processing apparatus, and a second another image processing apparatus different from the first another image processing apparatus; and a generating apparatus, the method comprising:

transmitting, by the image processing apparatus, to the first another image processing apparatus an image that is derived from at least one of a plurality of image capturing apparatuses and is used for generating a virtual viewpoint image;

receiving, by the image processing apparatus, an image transmitted from the second another image processing apparatus;

transmitting, in a case where an image to be received from the second another image processing apparatus is received, the received image to the first another image processing apparatus;

transmitting, in a case where an image to be received from the second another image processing apparatus is not received, an alternate image to the first another image processing apparatus, the alternate image being an image used for the virtual viewpoint image; and generating, by the generating apparatus, the virtual viewpoint image based on a plurality of images transmitted by the plurality of image processing apparatuses.

13. A non-transitory computer-readable storage medium storing a computer program for causing a computer to execute a method of controlling an image processing apparatus constituting a plurality of image processing apparatus that transmit a plurality of images to an image generating apparatus which generates a virtual viewpoint image on the basis of the plurality of images, the method comprising:

transmitting, to a first another image processing apparatus among the plurality of image processing apparatuses, an image that is derived from at least one of a plurality of image capturing apparatuses and is used for generating a virtual viewpoint image;

receiving an image transmitted from a second another image processing apparatus among the plurality of image processing apparatuses different from the first another image processing apparatus;

transmitting, in a case where an image to be received from the second another image processing apparatus is received, the received image to the first another image processing apparatus; and transmitting, in a case where an image to be received from the second another image processing apparatus is not received, an alternate image to the first another image processing apparatus, the alternate image being an image used for the virtual viewpoint image.

14. The image processing system according to claim 1, wherein in a case where an image is not received from the second another image processing apparatus before a predetermined amount of time passes, the image processing apparatus generates and transmits the alternate image to the first another image processing apparatus.

15. The image processing system according to claim 1, wherein in a case where the image received from the second another image processing apparatus is based on an erroneous image capturing by an image capturing apparatus, the image processing apparatus transmits the alternate image to the first another image processing apparatus.

16. The image processing system according to claim 1, wherein the image processing apparatus detects an error related to the image received from the second another image processing apparatus based on metadata added to the image received from the second another image processing apparatus.

17. The image processing system according to claim 16, wherein the metadata includes data indicating that an error is included in the image to which the metadata is added.

* * * * *